(12) United States Patent
Rajendran et al.

(10) Patent No.: US 12,006,899 B2
(45) Date of Patent: Jun. 11, 2024

(54) AIR FLOW DISTRIBUTION ARRANGEMENTS IN PRE-CLEANER SYSTEMS

(71) Applicant: Parker-Hannifin Corporation, Cleveland, OH (US)

(72) Inventors: Sucharitha Rajendran, North Billerica, MA (US); Thomas D. Carr, Franklin, TN (US); Daniel J. Copley, Westpoint, TN (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 169 days.

(21) Appl. No.: 17/734,725

(22) Filed: May 2, 2022

(65) Prior Publication Data

US 2022/0252028 A1 Aug. 11, 2022

Related U.S. Application Data

(63) Continuation of application No. PCT/US2020/058681, filed on Nov. 3, 2020.
(Continued)

(51) Int. Cl.
*F02M 35/10* (2006.01)
*B01D 35/30* (2006.01)
(Continued)

(52) U.S. Cl.
CPC ....... *F02M 35/10118* (2013.01); *B01D 35/30* (2013.01); *B01D 45/16* (2013.01);
(Continued)

(58) Field of Classification Search
CPC ......... F02M 35/10118; F02M 35/0201; F02M 35/0215; F02M 35/0216; F02M 35/0223;
(Continued)

(56) References Cited

U.S. PATENT DOCUMENTS

| 3,895,930 A | 7/1975 | Campolong |
|---|---|---|
| 4,482,365 A | 11/1984 | Roach |

(Continued)

FOREIGN PATENT DOCUMENTS

| CN | 104538064 A | 4/2015 |
|---|---|---|
| CN | 105664594 A | 6/2016 |

(Continued)

OTHER PUBLICATIONS

Parker-Hannifin Corporation, Monoclone, Inertial Air Filters www.parker.com/hydraulicfilter, Apr. 2012, 2 pages.
(Continued)

*Primary Examiner* — Syed O Hasan
(74) *Attorney, Agent, or Firm* — Reinhart Boerner Van Deuren P.C.

(57) ABSTRACT

A spin tube assembly for an engine air cleaner is provided. The spin tube assembly includes a housing, a spin tube panel, a plurality of spin tubes and at least one constrictor. The plurality of spin tubes are supported on the spin tube panel in parallel relation to one another. Each spin tube of the plurality of spin tubes includes a helical element causing air entering the spin tube to rotate such that particles within the air are moved by centrifugal action outwardly against a wall of the spin tube. At least one spin tube of the plurality of spin tubes has a constrictor upstream from the helical element thereof. The constrictor causes a localized restriction of air entering the at least one spin tube compared to the spin tubes without constrictors. Methods of use and configuration are also provided.

21 Claims, 28 Drawing Sheets

Related U.S. Application Data

(60) Provisional application No. 63/004,154, filed on Apr. 2, 2020, provisional application No. 62/930,674, filed on Nov. 5, 2019.

(51) Int. Cl.
 *B01D 45/16* (2006.01)
 *F02M 35/02* (2006.01)
 *F02M 35/022* (2006.01)

(52) U.S. Cl.
 CPC .... *F02M 35/0201* (2013.01); *F02M 35/0215* (2013.01); *F02M 35/0216* (2013.01); *F02M 35/0223* (2013.01)

(58) Field of Classification Search
 CPC ........ B01D 35/30; B01D 29/56; B01D 45/12; B01D 45/16; B01D 21/26
 See application file for complete search history.

(56) References Cited

U.S. PATENT DOCUMENTS

| | | | |
|---|---|---|---|
| 5,472,463 | A | 12/1995 | Herman et al. |
| 5,501,101 | A | 3/1996 | Purcell |
| 8,657,903 | B2 | 2/2014 | Menssen |
| 8,683,970 | B2 | 4/2014 | Chlystek et al. |
| 10,335,730 | B2 | 7/2019 | Krisko et al. |
| 2005/0252838 | A1* | 11/2005 | Fisher ................ B01D 27/08 210/434 |
| 2010/0229818 | A1 | 9/2010 | Silvano |
| 2013/0255203 | A1 | 10/2013 | Muenkel et al. |
| 2014/0165513 | A1 | 6/2014 | Oelpke |
| 2015/0273375 | A1 | 10/2015 | Krishnamurthy |
| 2015/0345439 | A1* | 12/2015 | Gomez ............ F02M 35/0223 123/184.21 |
| 2016/0230716 | A1* | 8/2016 | Finn ................ F02M 35/0201 |
| 2016/0305375 | A1 | 10/2016 | Finn |
| 2017/0296949 | A1* | 10/2017 | Krull .................... B01D 35/30 |

FOREIGN PATENT DOCUMENTS

| | | |
|---|---|---|
| CN | 205948516 U | 2/2017 |
| CN | 206081959 U | 4/2017 |
| CN | 109162838 A | 1/2019 |
| JP | 2004/284891 A | 10/2004 |
| JP | 2013/528750 A | 7/2013 |
| KR | 2018/0121354 A | 11/2018 |
| WO | WO 2011/159386 A1 | 12/2011 |

OTHER PUBLICATIONS

Parker-Hannifin Corporation, Superclone inertial precleaners www.parker.com/literature/fdrb113gb1.pdf, known to client on or before Nov. 5, 2019, 14 pages.

\* cited by examiner

| Geometry | 2" Short transition | | 2" 90 deg | | Rect. 90 deg | |
|---|---|---|---|---|---|---|
| | No Constrictor | With Constrictor | No Constrictor | With Constrictor | No Constrictor | With Constrictor |
| Pressure drop across pre-cleaner (in H20) | | | | | | |
| Experiment | 2.23 | 2.33 | 3.61 | 2.69 | 3.85 | 4.42 |
| Gravimetric efficiency of pre-cleaner (%) | | | | | | |
| Experiment | 14.2 | 54.3 | 21.1 | 40.3 | 16.9 | 63.2 |
| Δ in efficiency % | 40.1 | | 19.2 | | 46.3 | |

FIG. 9

AIR FLOW DISTRIBUTION ARRANGEMENTS IN PRE-CLEANER SYSTEMS

CROSS-REFERENCE TO RELATED PATENT APPLICATIONS

This patent application is a Continuation of PCT Application No. PCT/US2020/058681, filed Nov. 3, 2020. This patent application claims the benefit of U.S. Provisional Patent Application No. 63/004,154, filed Apr. 2, 2020. This patent application also claims the benefit of U.S. Provisional Patent Application No. 62/930,674, filed Nov. 5, 2019, the entire teachings and disclosure of which are incorporated herein by reference thereto.

TECHNICAL FIELD

The present invention relates to balancing incoming airflow to a pre-cleaner that includes spin tubes (e.g. cyclonic separators).

BACKGROUND

For proper performance of an engine, airflow to it needs to be clean. The air intake system is located upstream of the intake manifold and includes a pre-cleaner, whose primary job is to prevent premature contamination of a filter by inertial separation. Inertial separators separate particles from a fluid, particularly a gas, by changing the direction of flow of the fluid such that heavier particles are separated from the flow of fluid that is lighter. These are sometimes referred to as cyclonic separators, centrifugal separators, spin tubes or axial swirl tubes. The term spin tubes will be used generically to cover all of these prior types of pre-cleaners.

Pre-cleaners have spin tubes in a panel through which non-uniform incoming dust-laden air passes. When the incoming airflow is unevenly distributed between the spin tubes, the performance of the pre-cleaner is reduced. When the airflow is not even between the various spin tubes, the efficiency of the system drops. The unevenness of the air mass flow can be the result of the geometry of the inlet to the pre-cleaner which may be unmodifiable for various reasons, such as the envelope in which the pre-cleaner must be installed or the available space occupied by the duct work within the engine compartment supplying air to the pre-cleaner.

U.S. Patent US20150273375A1 owned by Honeywell, describes using a diffuser to process gas inlets into the chamber for fluid catalytic cracking processes. This application has more open volume compared to the pre-cleaners and can implement diffusers to aid in distribution of incoming air. U.S. Patent US20100229818A1 owned by Honda Motor looks at intake air configuration for preventing flow separation and maintaining laminar flow until the pre-cleaner. The solutions from Honda Motor look at modification in the ductwork leading to the pre-cleaner. Most engine air intake situations do not have enough room for ductwork modifications to even out the airflow for the pre-cleaner. The proposed solution is a feature attached to the pre-cleaner itself and can be used for any type of system ductwork.

Prior art also includes Monoclone inertial air filters and SuperClone inertial pre-cleaners distributed by Parker-Hannifin Corporation of Cleveland Ohio.

BRIEF SUMMARY OF THE INVENTION

Embodiments of the present invention include improvements over the current state of the art. More particularly, embodiments provide new and improved pre-cleaners for air cleaner systems. In particular embodiments, constrictors are provided upstream of spin tubes of a spin tube panel to more uniformly distribute the air mass flow through the various spin tubes of the spin tube panel.

In an embodiment, a spin tube assembly for an engine air cleaner is provided. The spin tube assembly includes a housing, a spin tube panel, a plurality of spin tubes and at least one constrictor. The housing including a housing inlet. The spin tube panel is located downstream of the inlet. The plurality of spin tubes are supported on the spin tube panel in parallel relation to one another. The plurality of spin tubes are configured for receiving air entering the housing inlet. Each spin tube of the plurality of spin tubes includes a helical element causing air entering the spin tube to rotate such that particles within the air are moved by centrifugal action outwardly against a wall of the spin tube. At least one spin tube of the plurality of spin tubes has a constrictor upstream from the helical element thereof. The constrictor causes a localized restriction of air entering at least one spin tube compared to the spin tubes without constrictors.

This localized increase in restriction preferentially directs/redistributes incoming air flow. While these constrictors certainly cause a local increase in restriction, they do not cause a large increase in the system's overall restrictions, like adding a diffuser might otherwise do. Thus, aspects of the application are quite unique in causing a significant improvement in the overall efficiency while not costing much in terms of the system's overall restriction.

In one embodiment, the plurality of spin tubes is arranged in a matrix including a central spin tube. The constrictor is located upstream from the central spin tube.

In one embodiment, the constrictor comprises a constrictor tube. An inner diameter of the constrictor tube increases in dimension when moving from a constrictor inlet of the constrictor tube that receives air from the housing inlet to a constrictor outlet of the constrictor tube directing air to at least one spin tube.

In one embodiment, the inner diameter of the constrictor tube at the constrictor outlet is the same as an inner diameter of an inlet of the at least one spin tube.

In one embodiment, the housing inlet is arranged such that air flow directed at the spin tube panel has an uneven mass flow including a high mass flow region and a low mass flow region. The constrictor is located inline with the high mass flow region. As such, the high mass flow portion of the air flow interacts with the constrictor and a portion thereof is prevented from passing through the corresponding spin tube and must thus pass through one of the other spin tubes increasing the mass flow therethrough. To some degree, this is due to the localized increase in restriction due to the constrictor(s).

In one embodiment, the housing inlet includes ductwork that has an upstream region, a bend and a downstream region. The bend is positioned between the upstream region and the downstream region. The downstream region is oriented such that airflow exiting the downstream region is directed substantially directly at the spin tube panel.

In one embodiment, the constrictor includes a constrictor body having a constrictor inlet and a constrictor outlet. The constrictor inlet has a constrictor inlet diameter. The constrictor inlet is upstream of the constrictor outlet. The at least one spin tube of the plurality of spin tubes that includes a constrictor upstream thereof has a spin tube inlet that has a spin tube inlet diameter that is greater than the constrictor inlet diameter.

In one embodiment, the constrictor outlet has a constrictor outlet diameter. The constrictor outlet diameter is greater than the constrictor inlet diameter.

In one embodiment, the constrictor tube has an outer periphery. The outer periphery has a tapered outer periphery portion. A diameter of the outer periphery portion increases when moving from the constrictor inlet toward the constrictor outlet.

In one embodiment, the inner diameter of the constrictor tube tapers from the constrictor inlet to the constrictor outlet such that it increases when moving towards the constrictor outlet.

In one embodiment, the constrictor comprises a constrictor tube having a constrictor inlet that receives air from the housing inlet and a constrictor outlet directing air to at least one spin tube. The constrictor has a length between the constrictor inlet and the constrictor outlet. The constrictor tube has an inner periphery. The inner periphery has a tapered portion, which may or may not extend the entire length. The tapered portion increases in diameter when moving toward the constrictor outlet.

In one embodiment, the tapered portion extends less than the entire length between the constrictor inlet and the constrictor outlet.

In one embodiment, the increase in cross-sectional area of the tapered portion is non-linear when moving toward the constrictor outlet.

In one embodiment, an angle of the inner periphery of the constrictor tube relative to a central axis of the constrictor is configured to prevent separation of air flowing through the constrictor at a predetermined rate from the inner periphery of the constrictor tube.

In one embodiment, the plurality of spin tubes defines a spin tube inlet plane that is generally orthogonal to air flow through the plurality of spin tubes and is axially located at inlets of the plurality of spin tubes. A constrictor inlet of the constrictor is positioned axially upstream of the inlet plane. In this arrangement, the air flow encounters the inlet of the constrictor before encountering the inlet of the spin tubes that does not include a constrictor.

In one embodiment, the housing inlet has an upstream region that has a first cross-sectional area that is generally orthogonal to the flow air therethrough and a downstream region having a second cross-sectional area that is generally orthogonal to the flow of air therethrough. The second cross-sectional area is greater than the first cross-sectional area. Air flowing through the downstream region has a non-uniform mass flow. A constrictor inlet of the constrictor is located in line with and downstream from a portion of the downstream region that has a first localized mass flow that is greater than the average mass flow through the downstream region.

In one embodiment, the plurality of spin tubes includes a constrictor free spin tube that is a spin tube of the plurality of spin tubes that does not include a constrictor upstream thereof and in line with a constrictor such that the air flowing through the constrictor free spin tube does not pass through a constrictor prior to passing through the constrictor free spin tube. An inlet of the constrictor free spin tube is located in line with and downstream from a portion of the downstream region having a second localized mass flow that is less than the first localized mass flow. Typically, this second localized mass flow will be less than the average mass flow through the pre-cleaner.

In one embodiment, the constrictor is not a deflector/vane that simply redirect air flow upstream of the panel of spin tubes.

In an embodiment, a method of removing particulates from a stream of air is provided. The method includes flowing the air through the constrictor of the spin tube assembly as outlined above at a predetermined rate. A tapered portion of the inner periphery of the constrictor tube is configured to minimize flow separation between the air flowing through the constrictor and the inner periphery of the constrictor tube.

By preventing/minimizing separation from the inner periphery, the air flow through the constrictor and thus into the downstream spin tubes uses the entirety of the cross-sectional area of the components. Thus, the entirety of the diameter of the helical elements is used to spin the flowing air rather than just an inner portion of the helical elements. Thereby increasing separation efficiency. Further, it moves the air further radially outward reducing the risk that particulates will simply pass through the clean air outlet of the spin tubes downstream of the helical elements.

In an embodiment, a method of configuring a spin tube assembly of any one of embodiments is provided. The method includes determining a mass flow distribution of air flowing through the spin tubes without the constrictor at a predetermined rate. The method includes locating a constrictor upstream for at least one spin tube of the plurality of spin tubes that has a greater amount of mass flow than at least one other spin tube of the plurality of spin tubes.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 9 provides test data for various air cleaner assemblies described herein;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
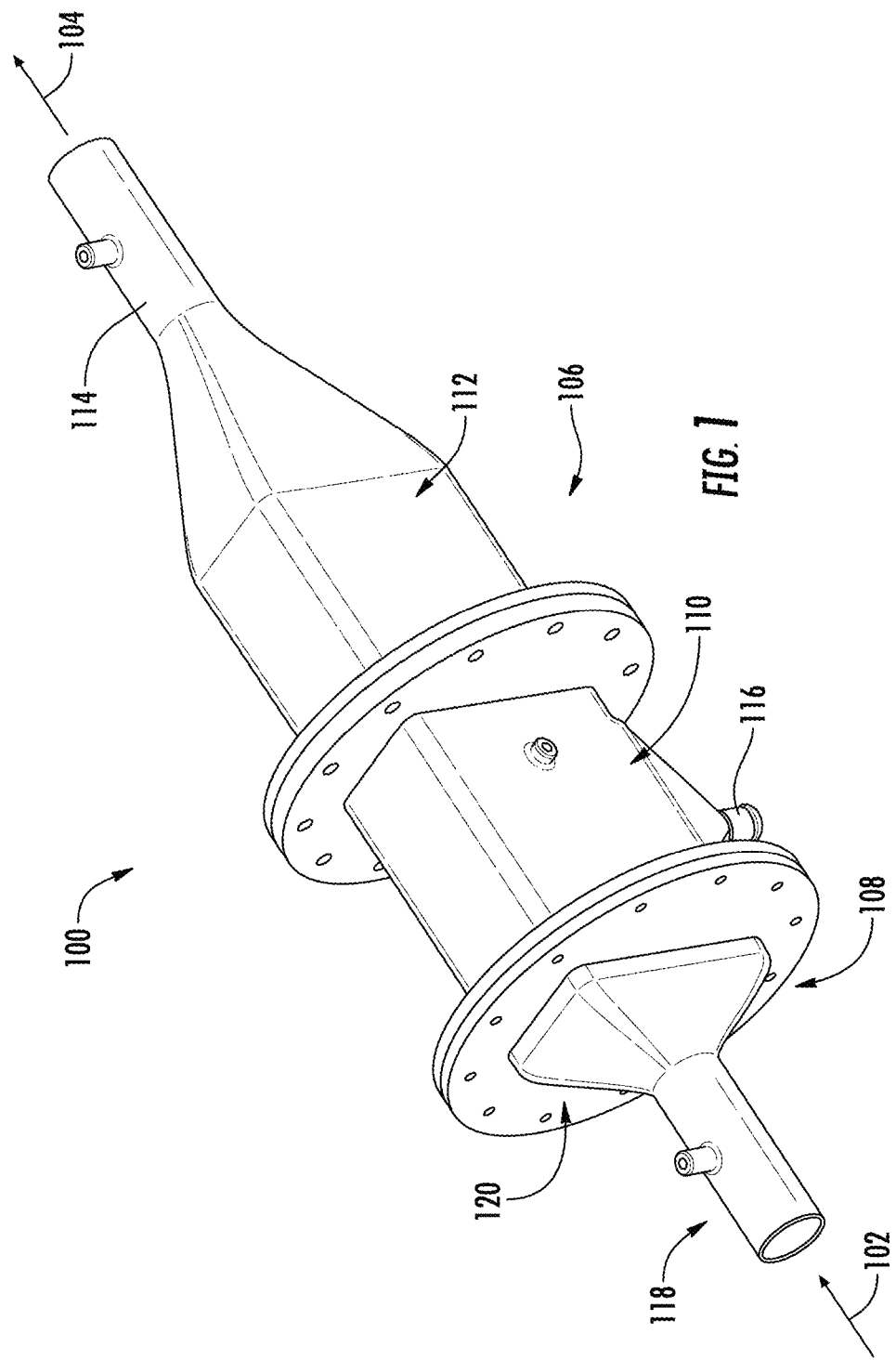
FIG. 1 is a perspective illustration of a first air cleaner assembly.

FIG. 1 illustrates an air cleaner assembly 100 according to an implementation of the teachings of the present application. The shape and configuration of this embodiment and other embodiments is merely representative in nature and further configurations are contemplated. The air cleaner assembly 100 is used to separate particulates from a flow of dirty air 102 to provide clean air 104 for a downstream system, e.g. a combustion engine. While the present air cleaner assembly 100 finds particular applicability in combustion engine environments, other environments are contemplated such as turbines, HVAC, cab air cleaners, etc.

The air cleaner assembly 100 generally includes a housing 106. The housing includes various different sections, which may be independent components or different regions of a single component, including a housing inlet 108, a pre-cleaner housing 110, a filter housing 112, and a housing outlet 114. Air flows in a downstream manner from the housing inlet 108 to the housing outlet 114.

The pre-cleaner housing 110 collects particulates (dust) separated from the airflow and includes a dust outlet 116 where the separated dust may exit the air pre-cleaner housing 110.

In this implementation, the housing inlet 108 includes an upstream region 118 and a downstream region 120. The upstream region 118 has a first cross-sectional area generally orthogonal to air flow therethrough that is smaller than a second cross-sectional area of the downstream region 120.

Figure 2:
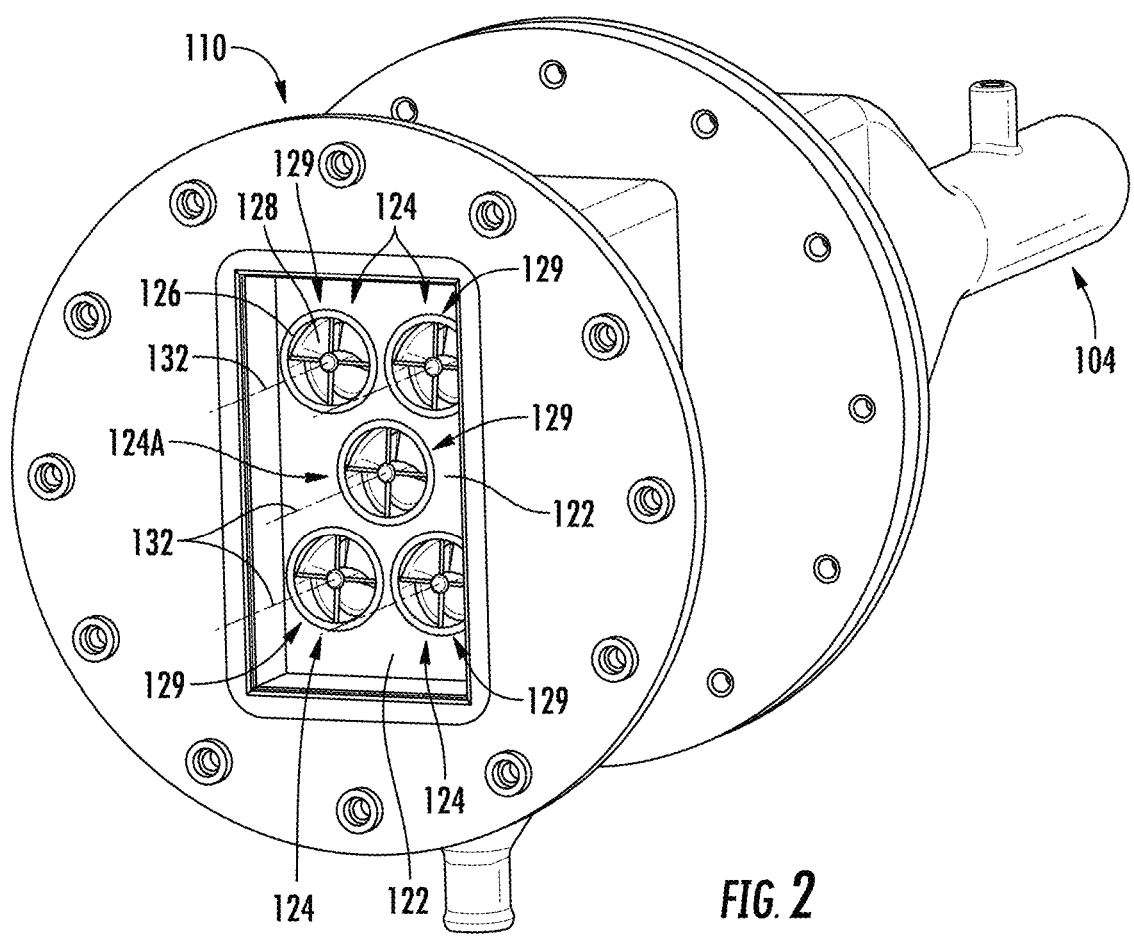
FIG. 2 is a partial perspective illustration of the air cleaner assembly of FIG. 1 having the housing inlet removed.
Figure 3:
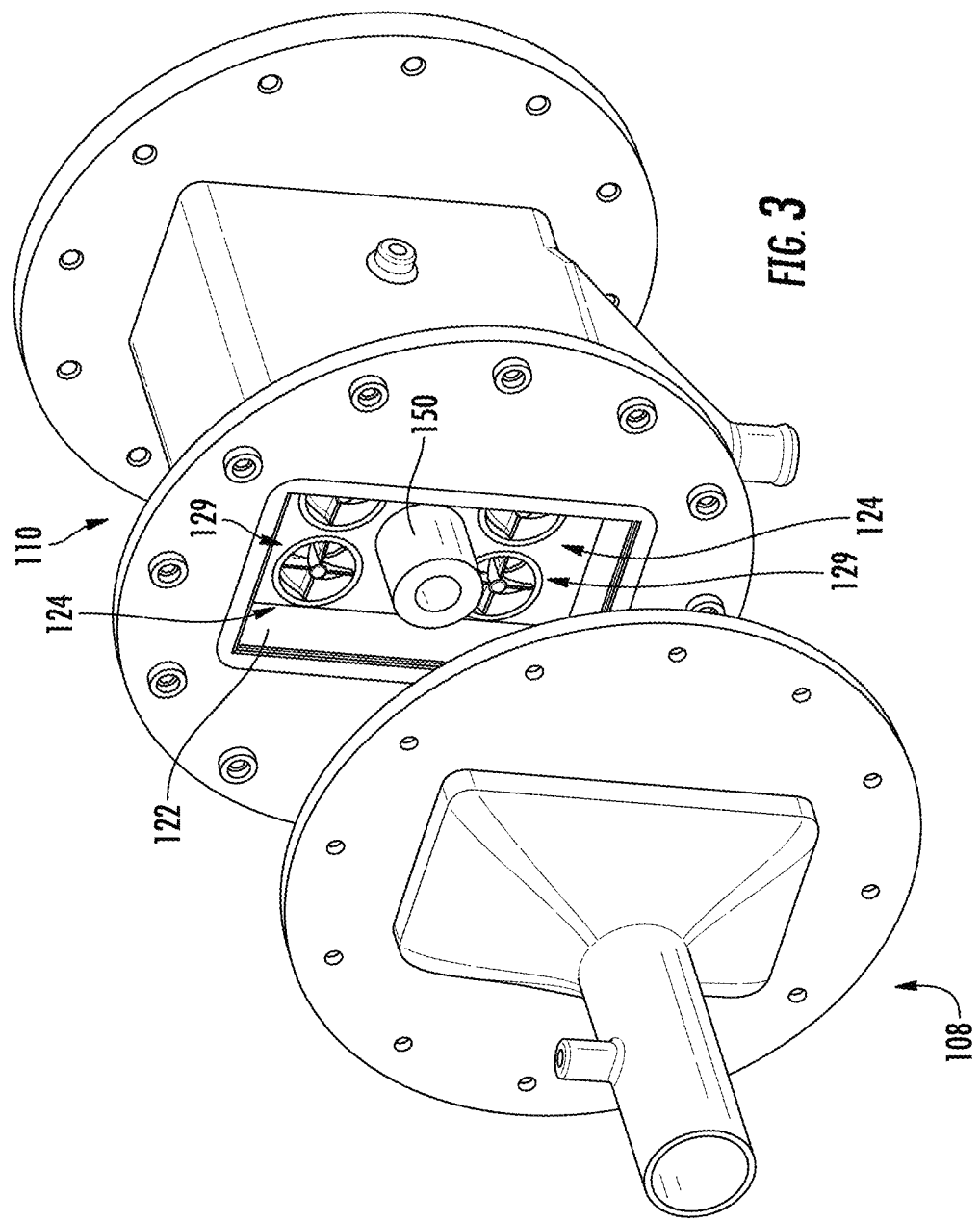
FIG. 3 is an exploded perspective illustration of the air cleaner assembly of FIG. 1 with the housing inlet removed.

With reference to FIGS. 1, 2 and 3, the upstream region 118 (see e.g. FIG. 1) has a generally circular cross-sectional shape and the downstream region 120 has a generally rectangular cross-section (see e.g. FIGS. 2 and 3).

In this embodiment, the upstream region 118 and downstream region 120 are generally co-axial such that there aren't any bends in the air flow when transitioning from the upstream region 118 to the downstream region 120. Further, the upstream region 118 is generally centrally located relative to the downstream region 120, e.g. the upstream region 118 is not shifted towards any of the four sides of the rectangular periphery of the downstream region 120.

With reference to FIG. 2, a spin tube panel 122 supports a plurality of spin tubes 124, i.e. this is a multi-pin tube panel. In this embodiment, five spin tubes 124 are provided. The five spin tubes 124 are arranged in an array with four spin tubes 124 at the corners and the fifth spin tube being a central spin tube, which is separately identified with reference character 124A. The spin tubes 124 themselves are identical.

Figure 29:
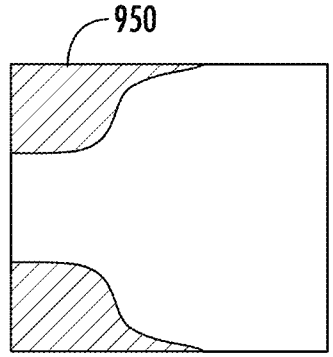
Figure 30:
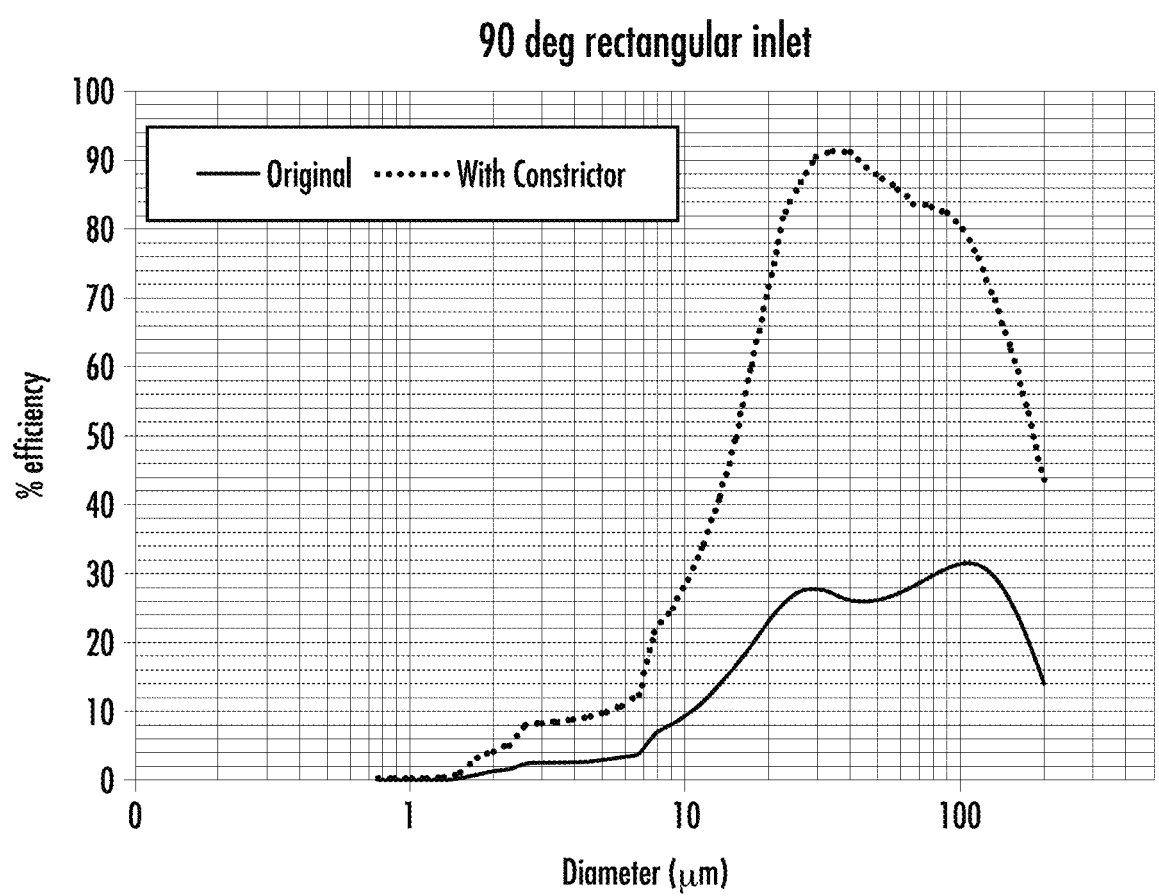
Figure 31:
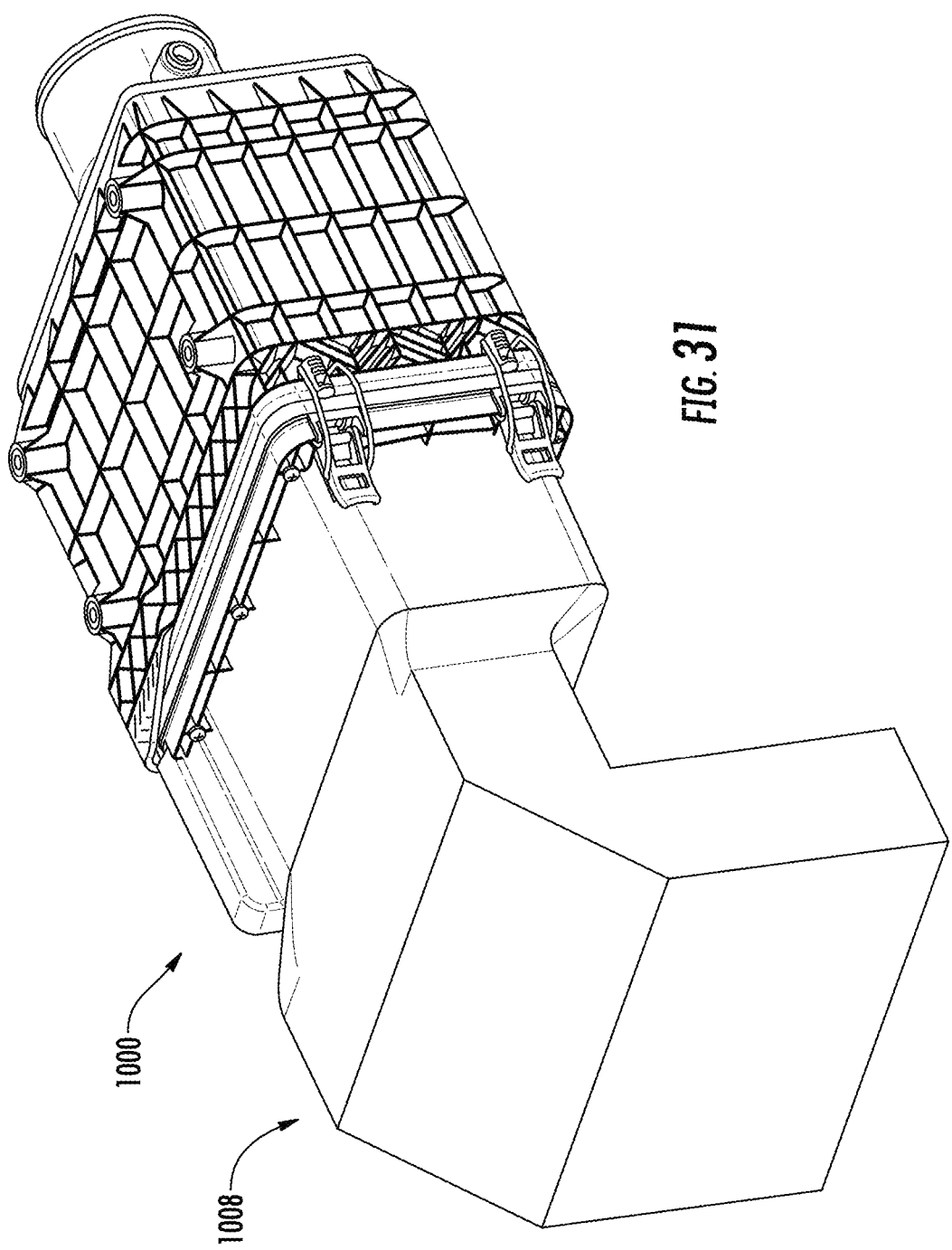
FIGS. 31-33 illustrate a further embodiment of an air cleaner assembly according to the present application.
Figure 32:
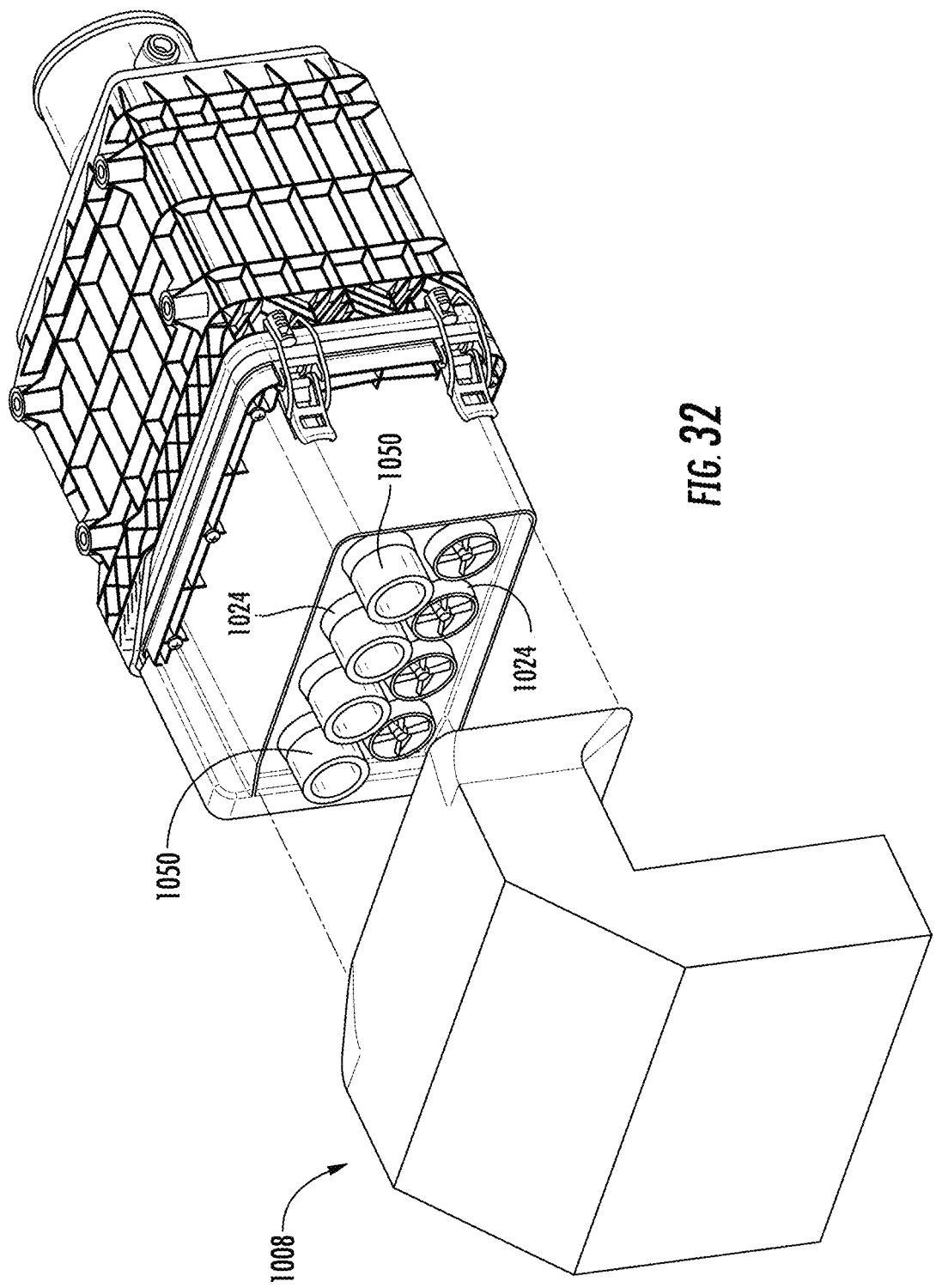
Figure 33:
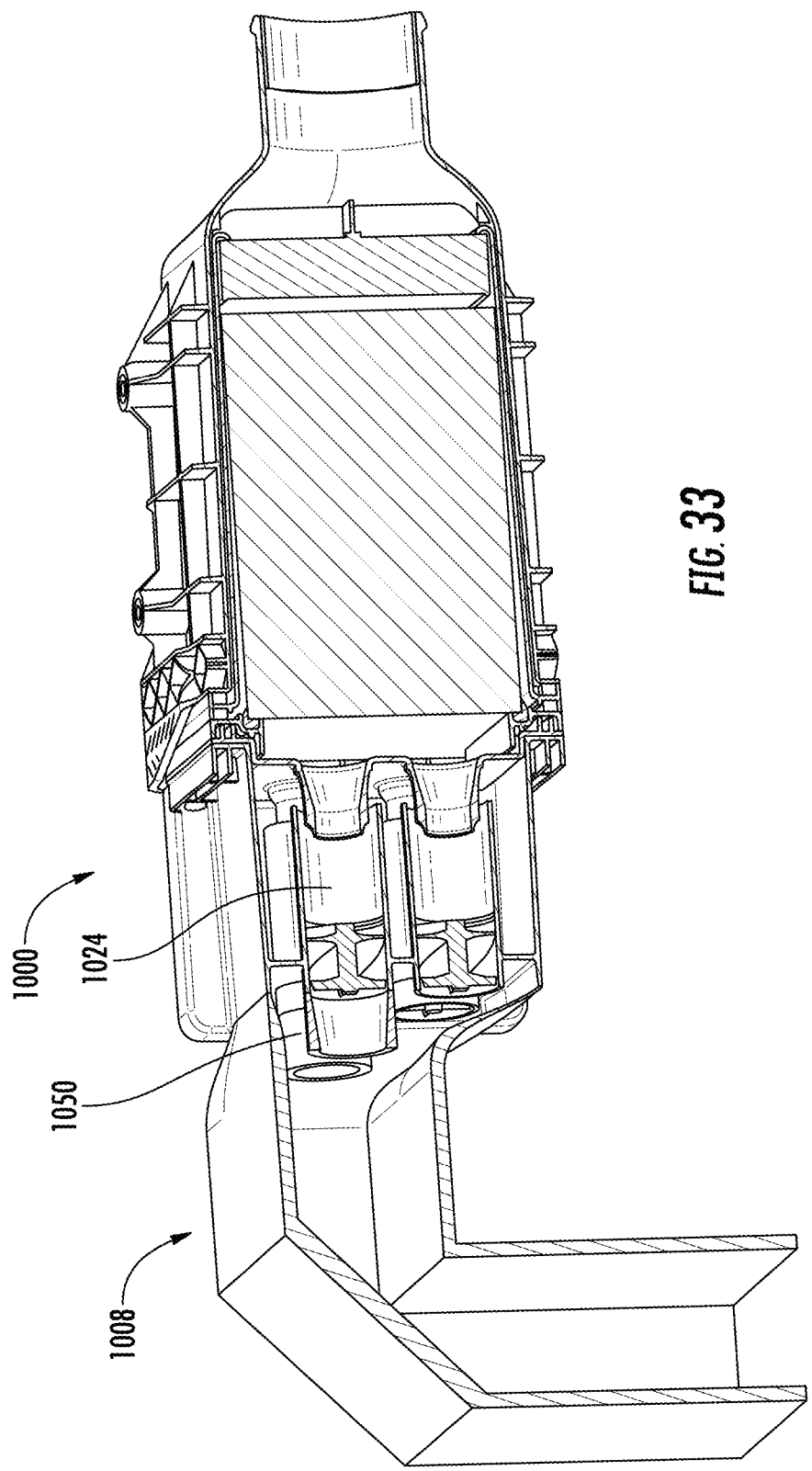

However, other numbers of spin tubes and different configurations are contemplated (see e.g. the embodiment of FIGS. 29 and 30 that has eight spin tubes and four constrictors). Further, while the spin tubes 124 and helical elements thereof may be identical, in other embodiments, the spin tubes 124 could be different from one another. For instance, the spin tubes 124 could have different lengths, different diameters, or the helical elements could be configured differently, e.g. by spinning the air flowing therethrough in opposite directions.

Figure 4:
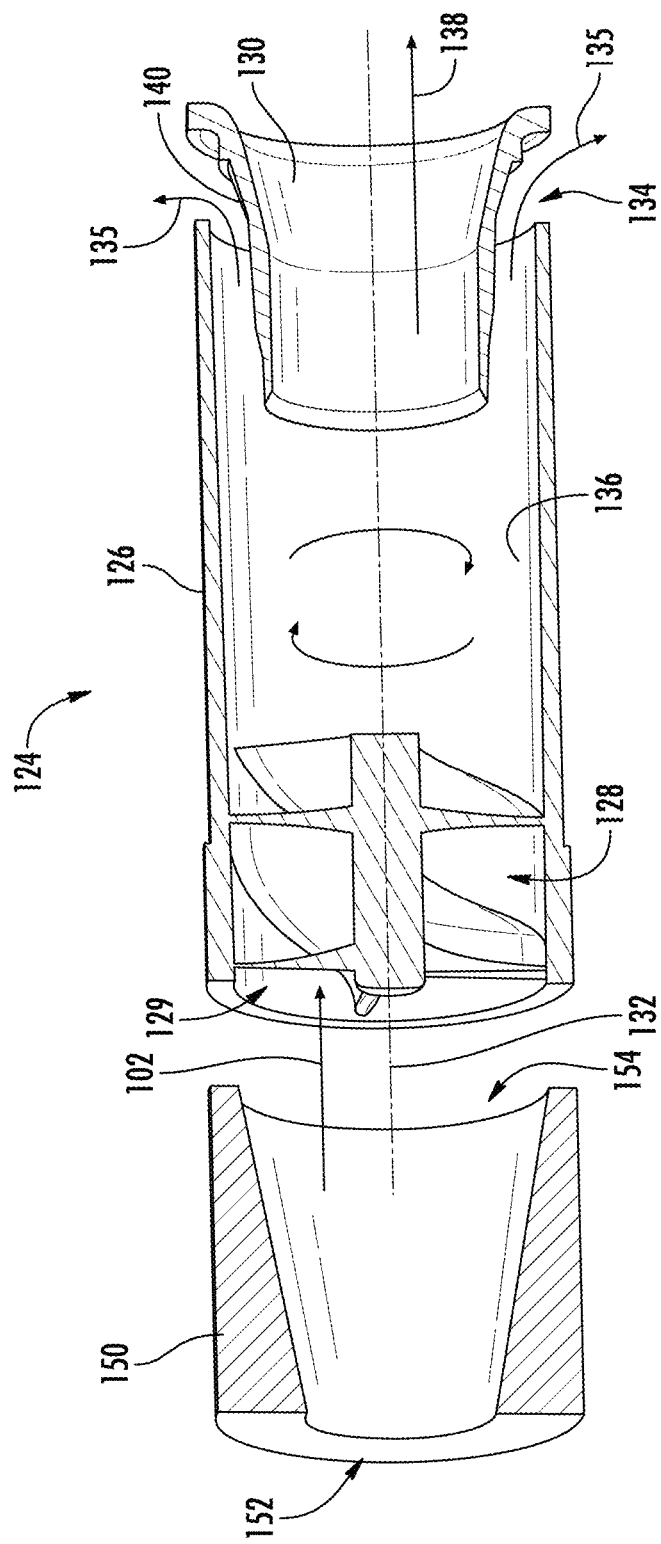
FIG. 4 is a cross-sectional and exploded illustration of a constrictor and spin tube assembly according to an embodiment of the invention.

FIG. 4 illustrates a spin tube 124 removed from spin tube panel 122. The spin tube 124 generally includes tube body 126, a helical element 128, and a clean air outlet 130. As is generally well known, air flowing through the spin tube 124 from inlet 129 toward outlet 130 is caused to rotate by the helical element 128 about a central axis 132. This rotating motion of the air causes particulates carried within the air to be accelerated radially outward relative to central axis 132 toward the inner surface 136 of the tube body 126 due to centrifugal forces. The tube body 126 and clean air outlet 130 form a particulate outlet 134. The heavier particulates remain proximate and/or against the inner surface 136 and flow out of the spin tube 124 through the dust outlet 134 (also referred to as a particulate outlet 134) illustrated by arrow 135. The lighter air has lower inertia and is permitted to move remain radially inward and to exit the spin tube 124 through clean air outlet 130 illustrated by arrow 138 providing pre-cleaned air.

The dust outlet 134 is formed by the channel formed between the inner surface 136 of tube body 126 and an outer surface 140 of clean air outlet 130.

Figure 5:
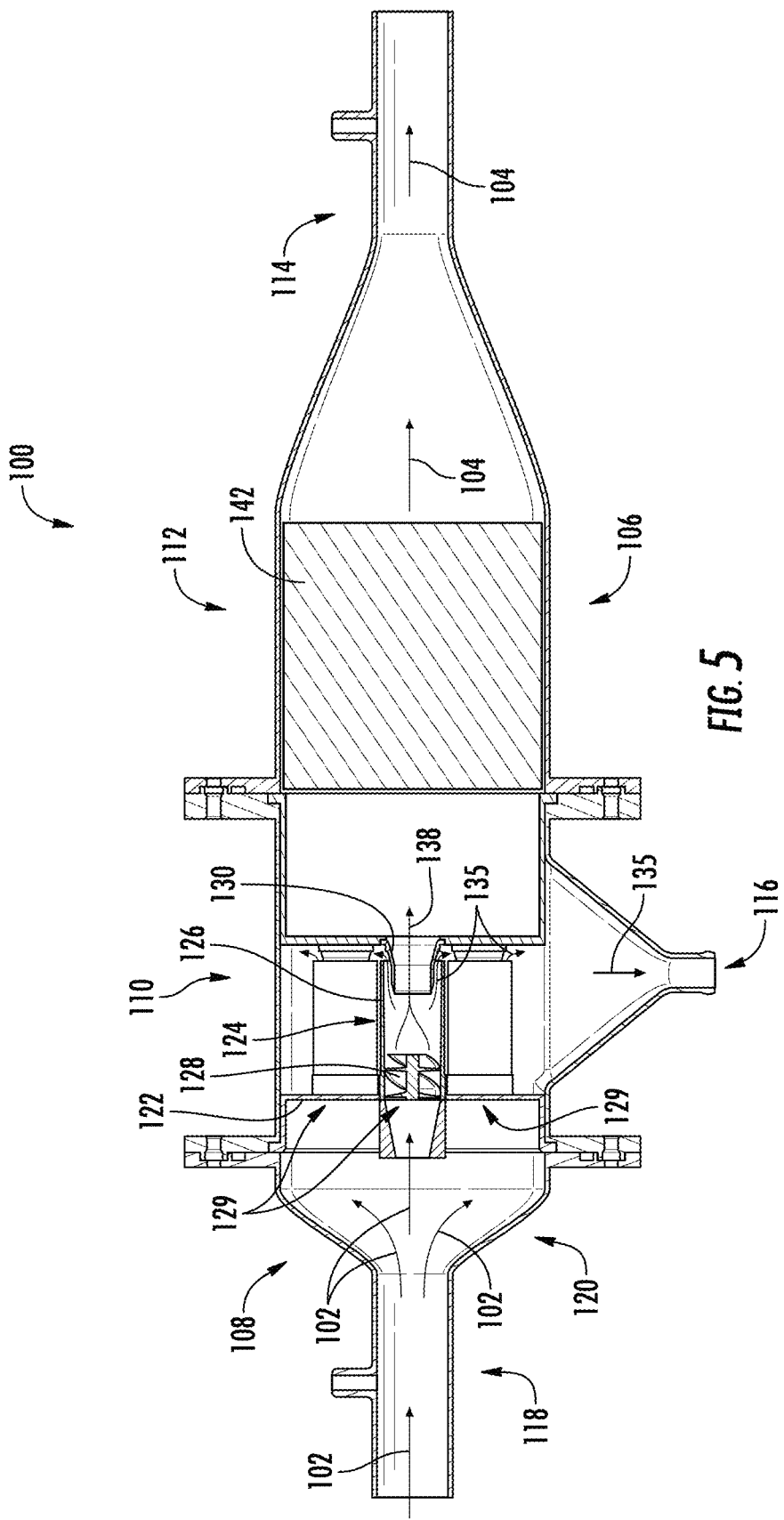
FIG. 5 is a cross-sectional illustration of the air cleaner assembly of FIG. 1.

With reference to FIG. 5, after exiting particulate outlet 134, the separated particulates 135 settle downward and exit pre-cleaner housing 110 via dust outlet 116.

The lighter cleaned air 138 will travel downstream. In this embodiment, the system includes a filter element 142 that includes filter media for further filtration of the air. The filter element 142 is typically configured to reduce smaller particulates that can remain within air flow 138. The filter element 142 is located within the filter housing 112 of housing 106. After passing through the filter element 142 and filter housing 112, the further cleaned air exits through outlet 114, as clean air 104.

The spin tubes 124 are generally arranged in parallel relation to one another. In other words, the axes 132 about which the air spins due to corresponding helical elements 128 are all generally parallel to one another (e.g. plus or minus 15 degrees). As noted above, the spin tubes 124 could be different configured such as shape and size as well as direction that the air is spun as it passes therethrough.

Due to the configuration of the housing inlet 108 and/or the array of spin tubes 124, the flow of air (air mass flow) to each of and the spin tubes 124 is not uniform. When the air mass flow is not uniform, the efficiency of the spin tubes 124 can be affected. For example, if the air mass flow is too small, insufficient rotational speed of the air flowing through the helical element 128 may be insufficient to cause sufficient centrifugal forces to allow for proper inertial effects on the heavier particulates to allow them to remain proximate inner wall 136 of tube body 126 allowing the particulates to remain within the flow path of the cleaned air 138 exiting through the outlet 130. This reduces the efficiency of the spin tube 124 and the overall efficiency of the pre-cleaner. Alternatively, if there is too much air mass flow through any one spin tube 124, the air flow may become turbulent such that rotational motion of the air within the spin tube 124 may be compromised such that insufficient centrifugal forces are generated reducing particulate removal efficiency.

In addition, the applicants have determined that if the air flowing through one spin tube 124 is sufficiently lower than the air flowing through an adjacent spin tube 124, air and dusting exiting the adjacent higher mass flow spin tube 124 can actually re-entrain into lower air flow tube. More particularly, the dust particulates will exit through the clean air outlets 130 in the low flow spin tube 124 significantly reducing the efficiency of the pre-cleaner.

Thus, it is important to have the spin tubes 124 exposed to a uniform air mass flow for proper functioning of the pre-cleaner to maximize the particulate removal efficiency.

To balance the mass flow through the various spin tubes 124, embodiments of the present application include at least one constrictor 150 upstream of the inlet 129 of corresponding spin tubes 124. The constrictor 150 is used to balance air mass flow through the pre-cleaner without providing significant restriction to the airflow through the pre-cleaner.

When the airflow is not even, the efficiency (e.g. percentage of particulates removed from the flow of air) of the system can be as low as 15%. Adding a constrictor 150 can bring this up to 60% or more depending on the arrangement by improving the evenness of air flow through the various spin tubes 124 and thus the amount of dust removed in the cyclonic separator before the air encounters the filter media. This dramatically increase the filter life of downstream filter elements.

In some embodiments, the airflow exiting the housing inlet 108, in particular, the airflow within and exiting downstream region 120 of the housing inlet 108 has a non-uniform mass flow. For example, in FIG. 6, due to the position and configuration of upstream region 118 relative to downstream region 120 and the spin tube panel 122, it can be imagined that a much larger air mass flow is directed towards central spin tube 124A. As such, to attempt to balance the mass flow to the remaining four spin tubes 124, constrictor 150 is located upstream of central spin tube 124A.

The constrictor 150 causes a localized restriction of air entering the corresponding spin tube, e.g. central spin tube 124A, as compared to the remaining spin tubes 124 that do not have corresponding constrictors 150 (e.g. the four spin tubes 124 proximate the corners of the spin tube panel 122).

Figure 8:
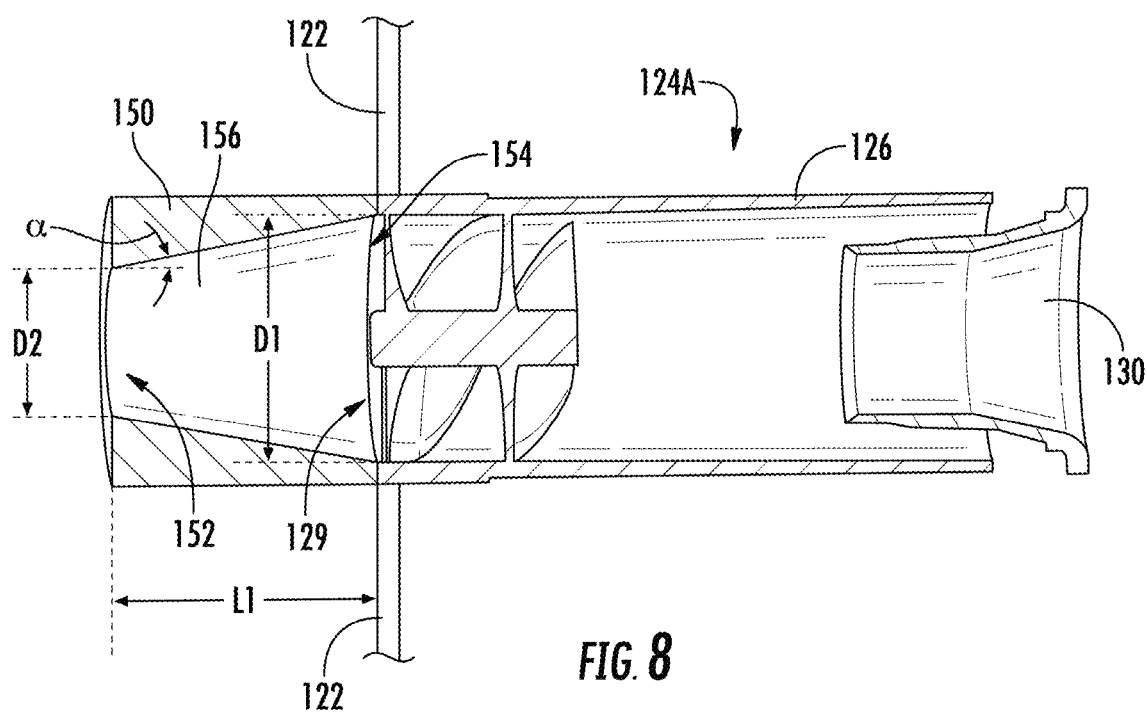
FIG. 8 is a cross-sectional assembled illustration of the constrictor and spin tube assembly of FIG. 4.

With reference to FIG. 8, a spin tube 124A and constrictor 150 are illustrated in cross-section. To provide the localized restriction in the flow path of the air flowing through the system, the inlet 152 of the constrictor 150 has an inner diameter D2 that is smaller than the inner diameter D1 of the inlet 129 of the spin tube 124A.

In this embodiment, the inner diameter of the constrictor 150 increases in dimension when moving toward a constrictor outlet 154. The inner surface 156 of the constrictor body of the constrictor 140, in this embodiment, has a linear taper as the inner surface 156 transitions from the constrictor inlet 152 to the constrictor outlet 154.

In this implementation, the outlet 154 of the constrictor 150 is the same diameter as the inlet 129 of the spin tube 124A. This arrangement helps prevent any undesirable flow effects that may occur at the junction between the constrictor 150 and the spin tube 124A.

Because of this arrangement, the constrictor inlet 152 thus has a smaller diameter than the inlet 129 of the spin tube 124A and the constrictor outlet 154.

The constrictor inlet 152 directly receives airflow from the housing inlet 108 and particularly from the downstream region 120.

It is desired that the length L1 of the constrictor 150 and the angle α of the taper of the inner surface 156 are configured relative to the desired air mass flow to minimize separation of the incoming air from the inner surface 156 of the constrictor 150 when air flows therethrough at a predetermined mass flow rate. More particularly, if the angle α is too great relative to the desired air mass flow, the flowing air will separate from the surface 156 of the constrictor 150. If the air separates from the inner surface 156 and does not reattach before reaching the spin tube 124, the air flowing through the constrictor 150 and into the spin tube 124 is not using the entirety of the cross-sectional area of the air flow path. As such, the entirety of the diameter of the helical elements is not being used to spin the air and allow for separation, and particularly the radially outer surfaces of the helical elements. Instead, the air flowing through the helical elements is more centralized relative to the axis about which the helical elements spin the air. Thus, the radially outer surface portions of the helical elements are not active in providing the centrifugal forces to separate the dust from the air. This also reduces efficiency because more particulates are closer to the centerline of the spin tubes and can then possibly exit the clean air outlet of the spin tubes rather than be separated as desired.

In some implementations, the angle α was determined sufficient if it was between 5 and 20 degrees when used with an air flow of 35 CFM per spin tube.

In this embodiment, the constrictor 150 is immediately upstream of the corresponding spin tube 124 such that the airflow from the constrictor 150 flows directly into the spin tube 124. This configuration is different from prior attempts to balance air mass flow, such as by way of using vanes or other flow directing devices positioning in the ductwork upstream of the bank of spin tubes.

In this embodiment, the constrictor 150 was added to the central spin tube 124A. This was done because the air mass flow is not uniform exiting the inlet and is greatest in the center of the cross-section of the downstream region 120 due to the upstream region 118 being centered on the downstream region 120. Thus, the constrictor is aligned with the most dense region of air mass flow as it approaches the pre-cleaner. The constrictor 150 limits the air mass flow through central spin tube 124A. Thus some of the air mass flow that would otherwise pass through central spin tube 124 is directed towards and through the remainder of the spin tubes 124.

Figure 6:
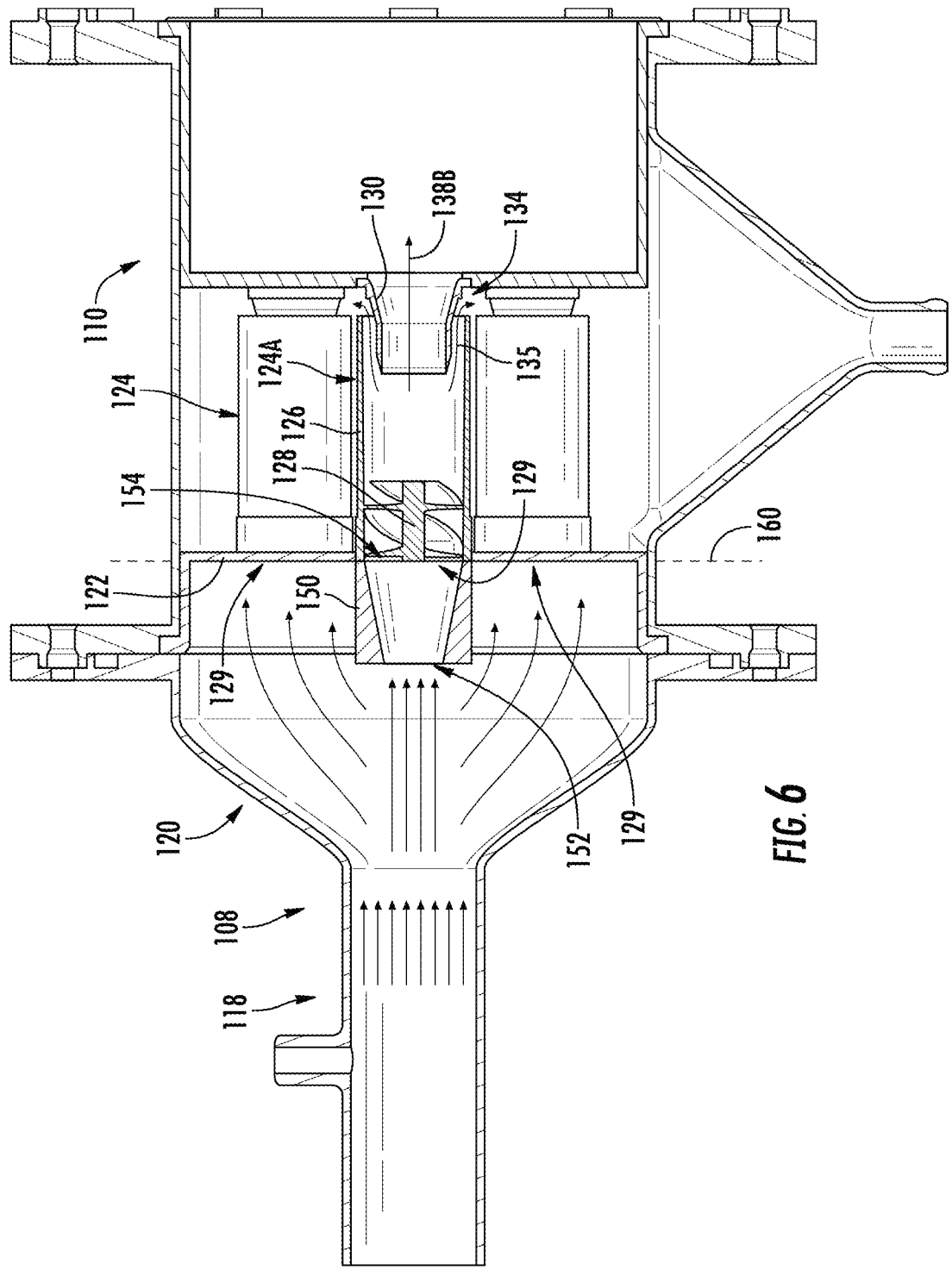
FIG. 6 is an enlarged cross-sectional illustration of a portion of the air cleaner assembly of FIG. 1.
Figure 7:
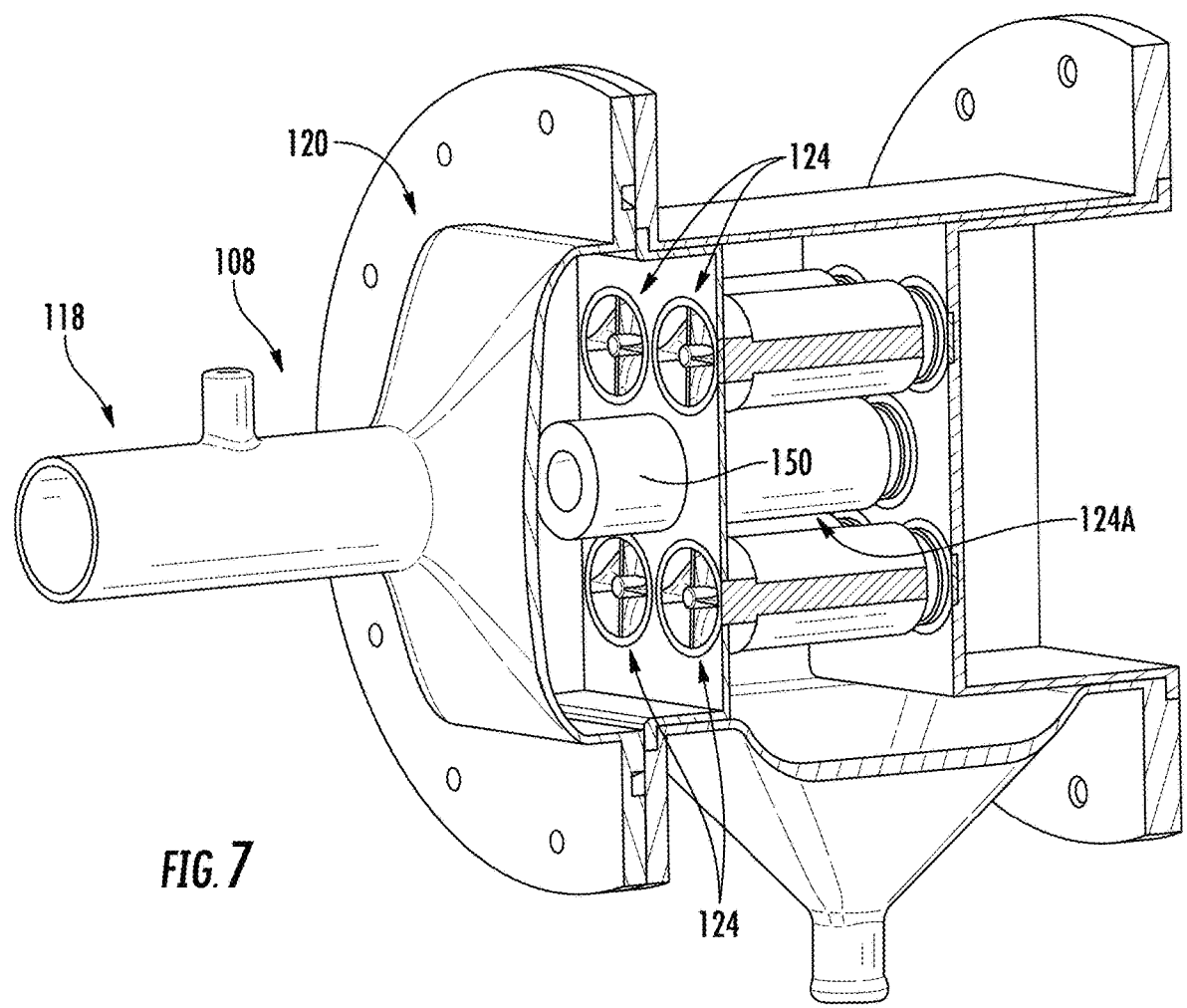
FIG. 7 is a perspective and cross-sectional illustration of a portion of the air cleaner assembly of FIG. 1.

With reference to FIGS. 5 and 6, the inlets 129 of the spin tubes 124 generally define an inlet plane 160 (FIG. 6), which may be viewed as the upstream side of panel 122 in FIG. 6. This plane is generally perpendicular to axes 132 (See FIG. 2). The constrictor inlet 152 is positioned axially forward of the inlet plane 160. Thus, redirected airflow that is not allowed to enter inlet 152 may easily flow downstream to the axially offset inlets 129 of the remaining spin tubes 124.

Figure 10:
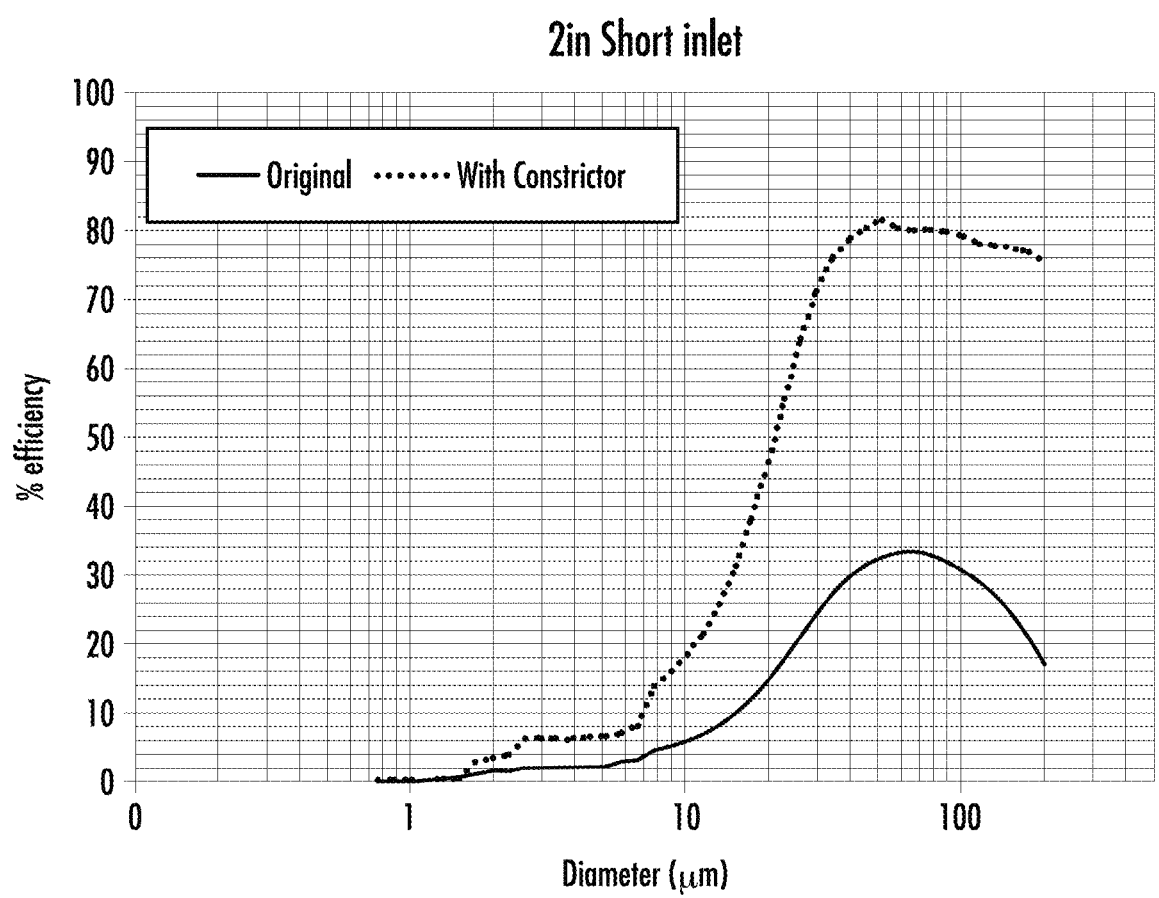
FIGS. 10-11 are representative test data related to use of the air cleaner assembly of FIG. 1.
Figure 11:
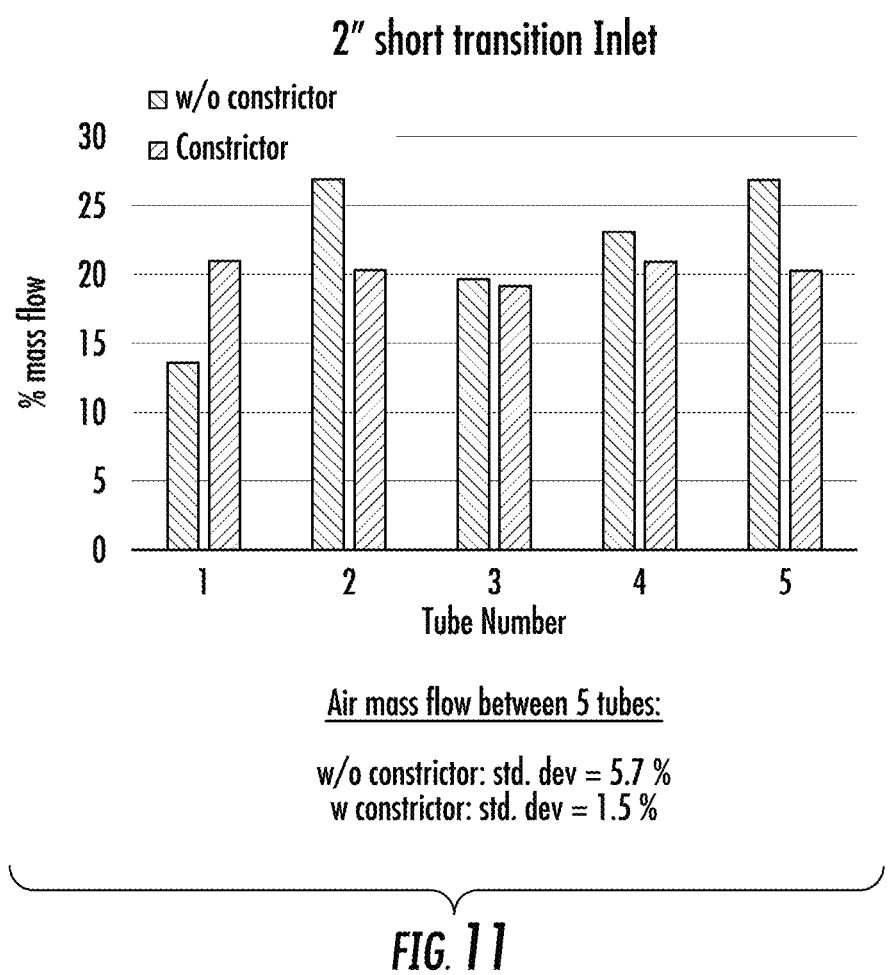

FIGS. 9-11 provide test data related to the use of the constrictor 150 in an air cleaner assembly 100 according to FIG. 1 with the constrictor 150 positioned as illustrated in FIGS. 3 and 5-7 (e.g. on the central spin tube 124A).

FIG. 9 provides gravimetric efficiency data. This data is the percentage of particulates that is removed from the dirty airflow. The data that relates to the system described in FIGS. 1-8 is under the heading 2" Short transition. The left column is without any constrictor and the right column is with the constrictor located as illustrated in FIG. 3. As illustrated in FIG. 9, the gravimetric efficiency increased from 14.2% without the constrictor to 54.3%.

FIG. 10 includes a plot of the efficiency related to particulate size of the particulates removed from the air using the air cleaner assembly without constrictors (solid line) and with the constrictor 150 (dashed line). As illustrated, the use of the constrictor increases the efficiency for all particulates sampled that are greater than 10 micrometers as compared to not using the constrictor. It is also noted that with the inclusion of the constrictor 150, the efficiency for smaller particulates, e.g. less than 10 micrometers significantly increases. Thus, not only does the efficiency of larger particulates increase, the pre-cleaner becomes more efficient at removing smaller particulate that were substantially not affected by the pre-cleaner at all without the constrictor.

FIG. 11 is plot of the percentage of air mass flow through each spin tube 124 as compared to the entire mass flow through the pre-cleaner. The left column is without the constrictor and the right column is with the constrictor as illustrated in the diagram, e.g. aligned with center spin tube 124A. As illustrated in FIG. 11, the mass flow percentage has significant variation between the spin tubes without the inclusion of constrictor 150. However, when a constrictor 150 is added to center spin tube 124, the mass flow through all of the spin tubes becomes more uniform. This is further illustrated by the significant reduction in standard deviation between the five spin tubes 124 as listed in FIG. 11.

As illustrated by this test data, aligning the constrictor 150 with the densest portion of the air mass flow (e.g. high mass flow region) of the inlet dirty air redistributes the air mass flow to improve overall efficiency of the pre-cleaner and to balance the air mass flow through all of the spin tubes 124. As such, the spin tubes 124 that do not have a constrictor associated therewith are aligned with portions of the air flow exiting the downstream region 120 of the air inlet that is at a lower density (e.g. low mass flow region) than the portions aligned with the constrictor 150.

Figure 12:
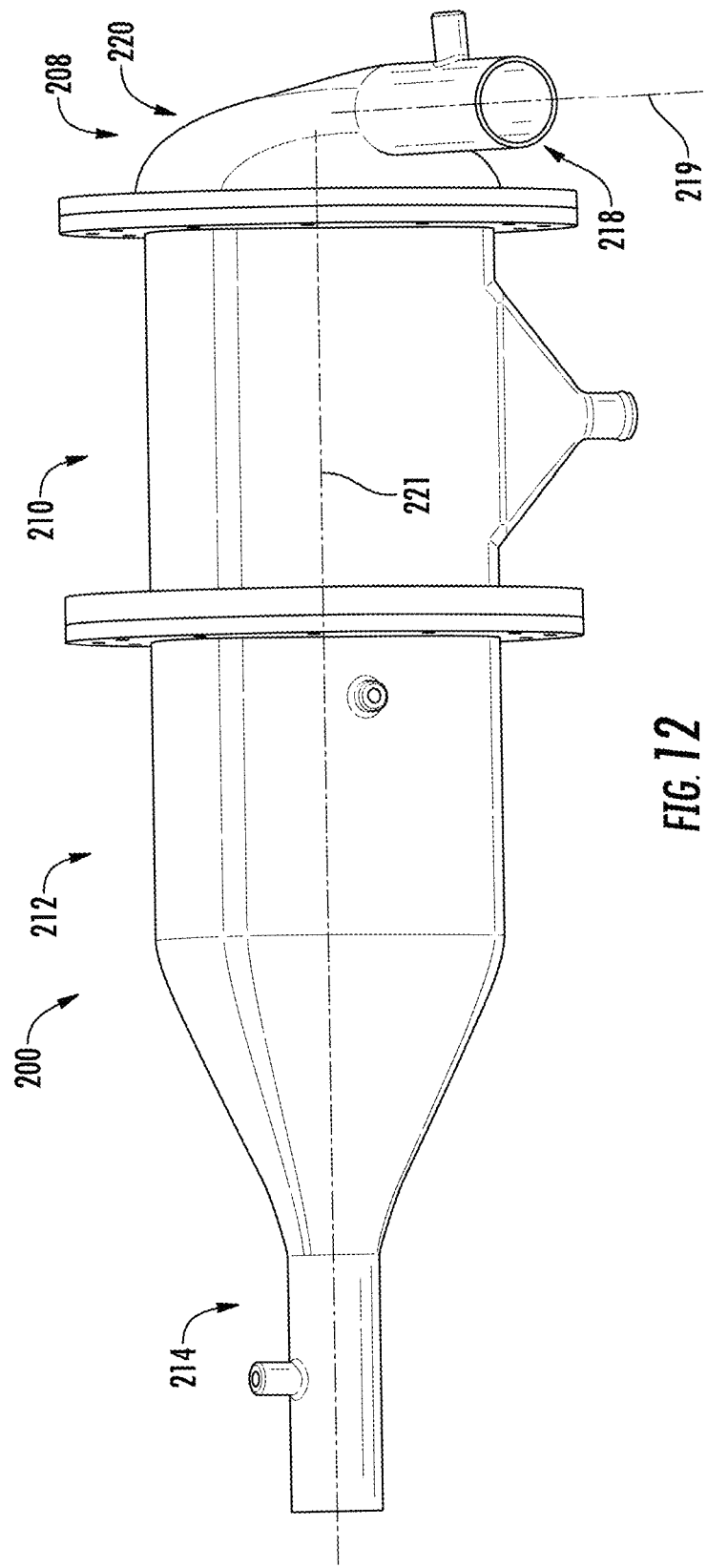
FIGS. 12 and 13 are perspective illustrations of a further embodiment of an air cleaner assembly.
Figure 13:
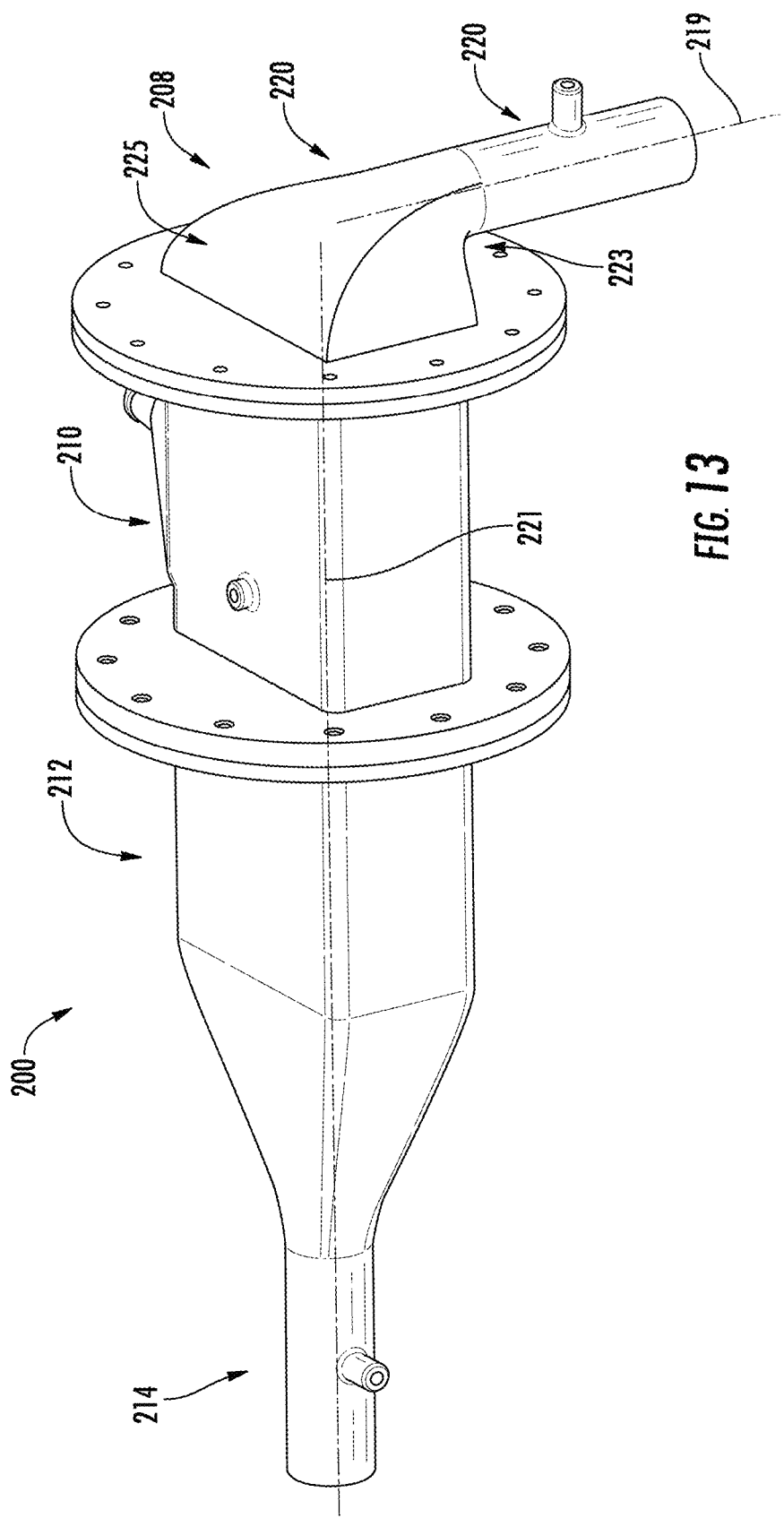
Figure 14:
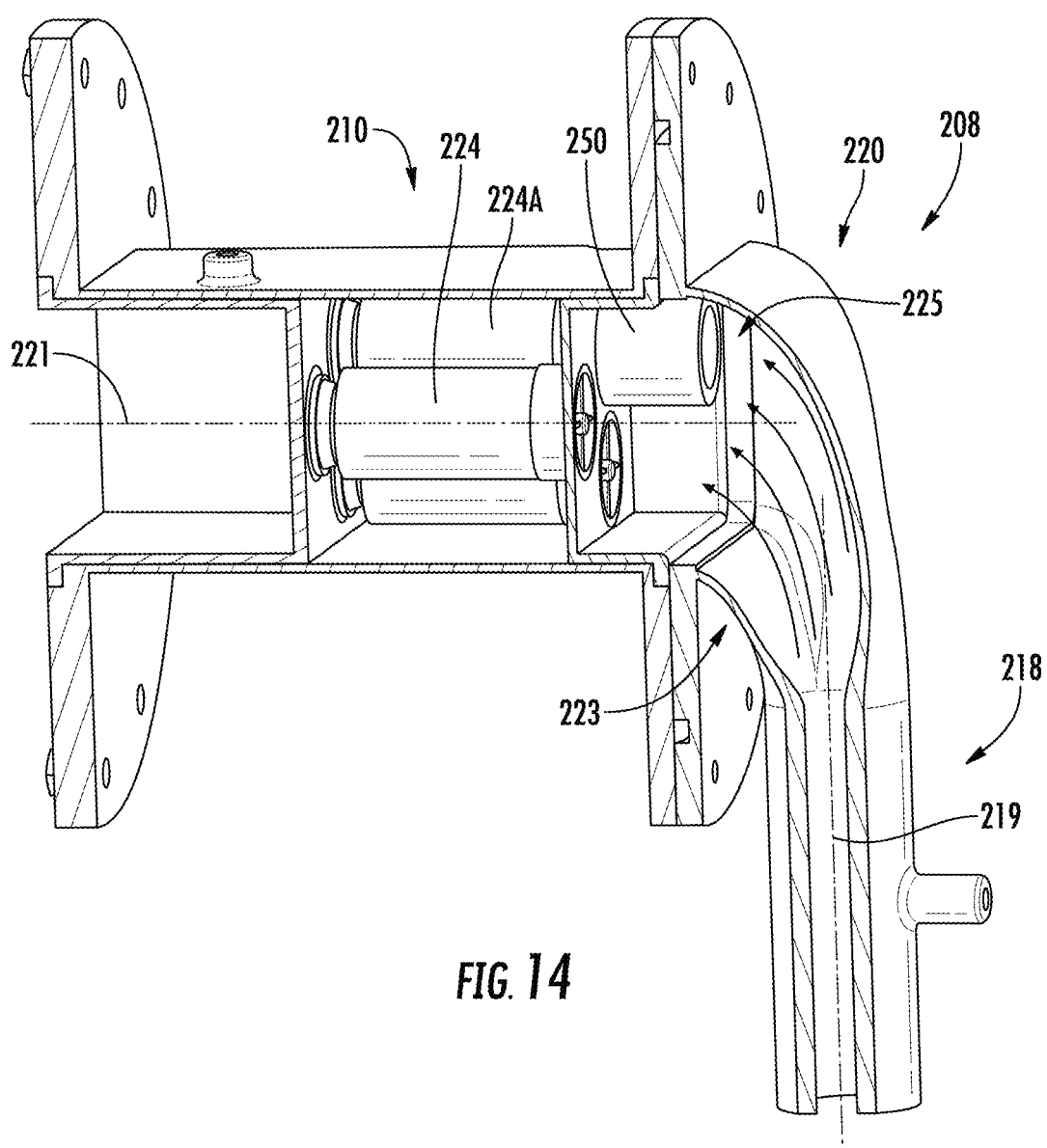
FIGS. 14-16 are cross-sectional illustration of the air cleaner assembly of FIGS. 12 and 13.
Figure 15:
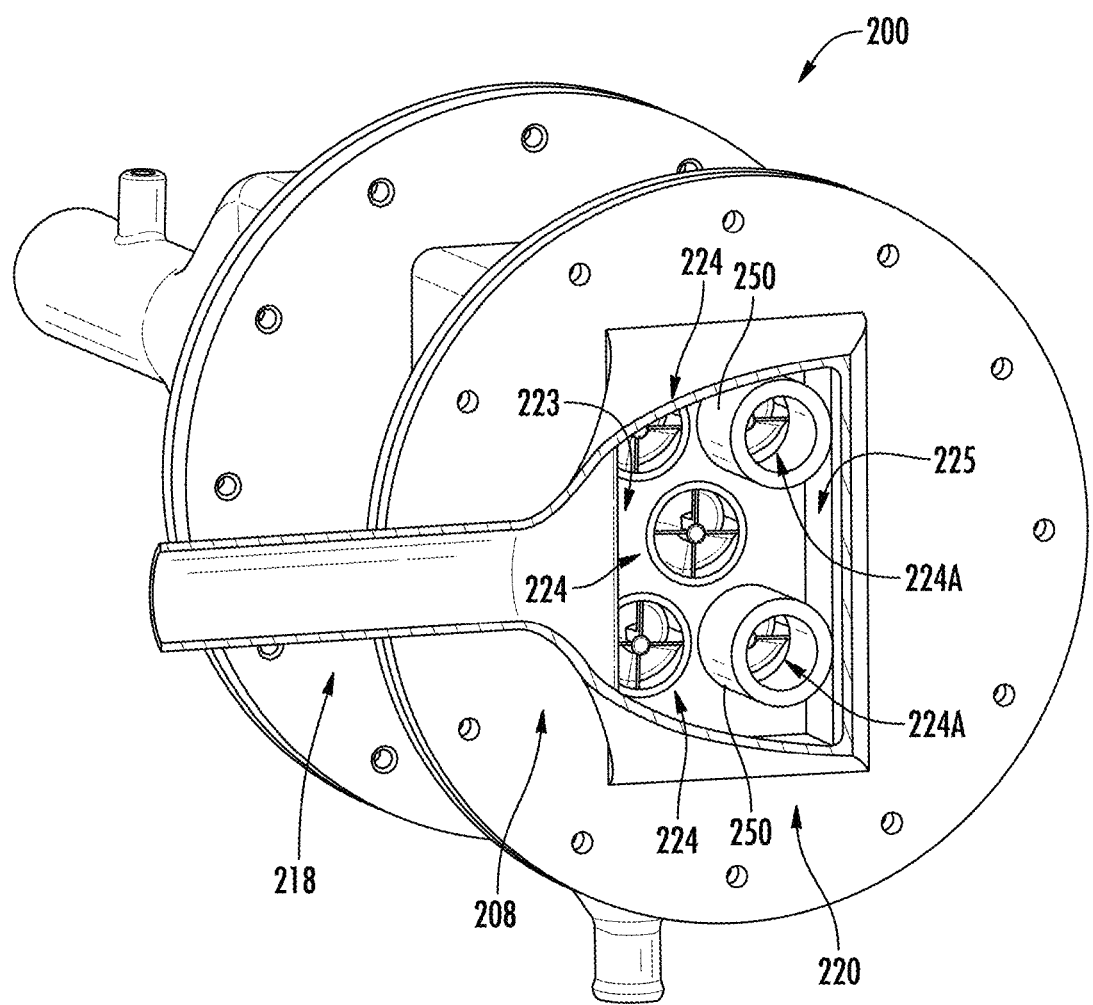
Figure 16:
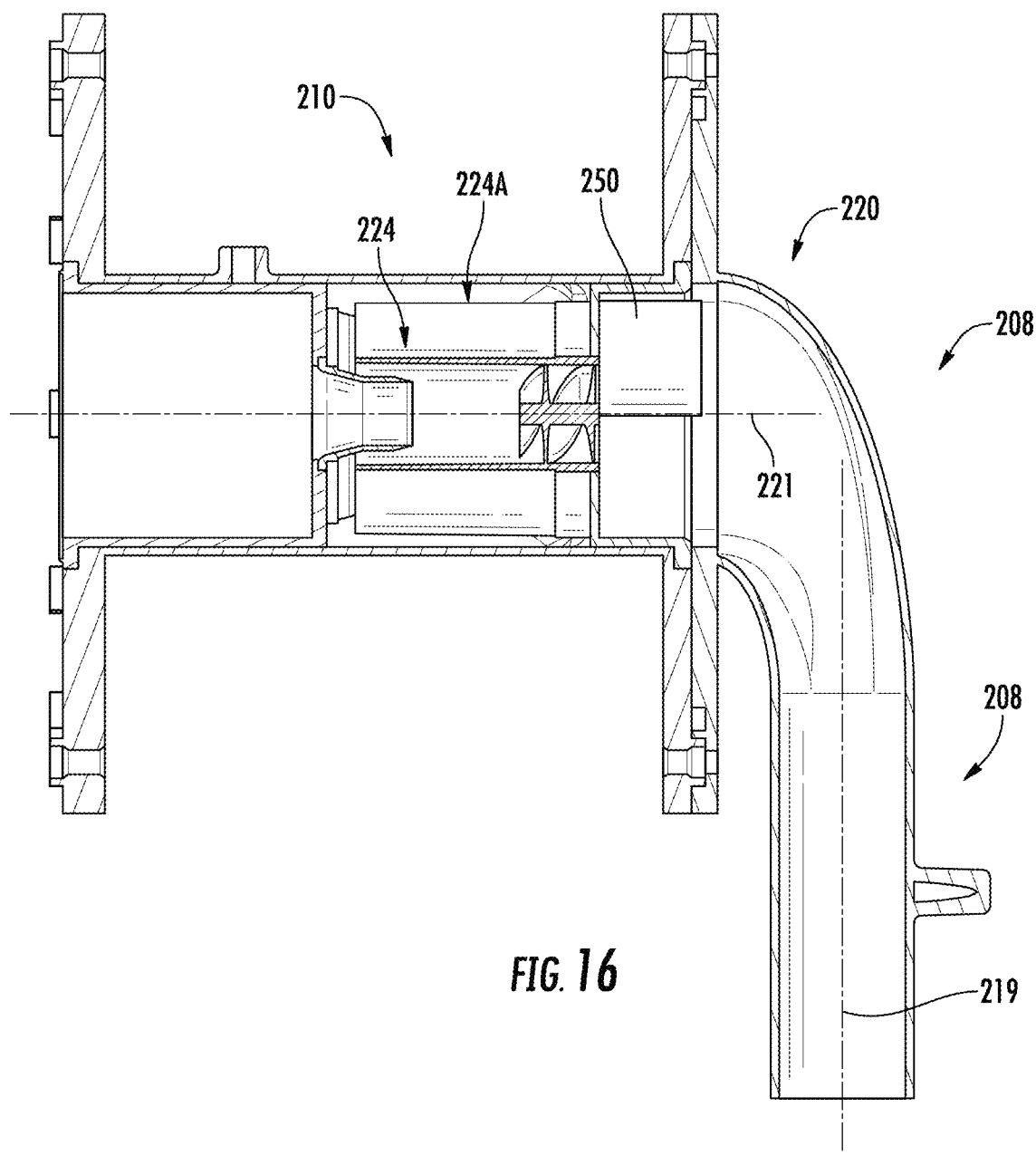

FIG. 12 illustrates a further embodiment of an air cleaner assembly 200. This embodiment is similar to the prior embodiment and all the features thereof are applied to this embodiment unless contradictory to the discussion of this embodiment. As such, this air cleaner assembly 200 includes a housing inlet 208, pre-cleaner housing 210, a filter housing 212 and a housing outlet 214.

In this implementation, the housing inlet 208 has an upstream region 218 and a downstream region 220. Once again, the upstream region 218 has a different cross-sectional area as the downstream region 220. In this implementation, the housing inlet 208 has a bend between the upstream region 218 and downstream region 220. As such, the airflow through the upstream region 218 and downstream region 220 of the housing inlet 208 extend along flow paths that are generally perpendicular to one another (see e.g. axes 219, 221). This may be due to the envelop in which the air cleaner assembly 200 must be positioned, such as in an engine compartment or the cabin of a vehicle.

In this arrangement, the airflow exiting the downstream region 220 is directed substantially at the spin tube panel 222.

Because of this bend, the air mass flow flowing through and ultimately exiting the downstream region 220, again, has a non-uniform distribution. In this arrangement, the portion of the air flow proximate the inside of the bend, e.g. proximate region 223, is less dense or has a lower air mass flow than the portion of the air flow proximate the outside of the bend, e.g. proximate region 225.

Because of this air mass flow distribution, the constrictors 250 are positioned aligned with the two spin tubes 224A that are offset towards a side of the spin tube panel 222 rather than aligned with the center spin tube as in the prior implementation. This creates local air flow restrictions proximate this side of the spin tube panel 222 forcing more air mass flow towards the other spin tubes 224 that do not include the constrictors 250 and that are aligned with the low mass flow portion of the air flow.

Figure 17:
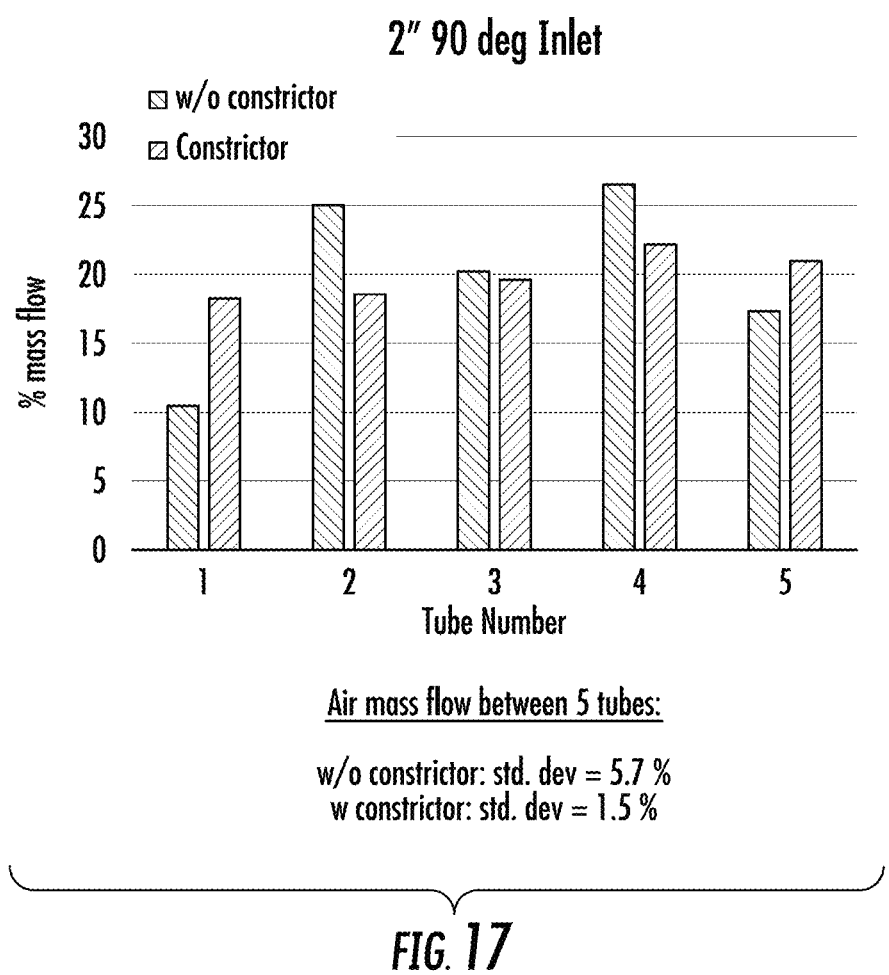
FIG. 17 are test data related to use of an air cleaner assembly similar to that of FIGS. 12 and 13 but with a slightly different constrictor placement.
Figure 18:
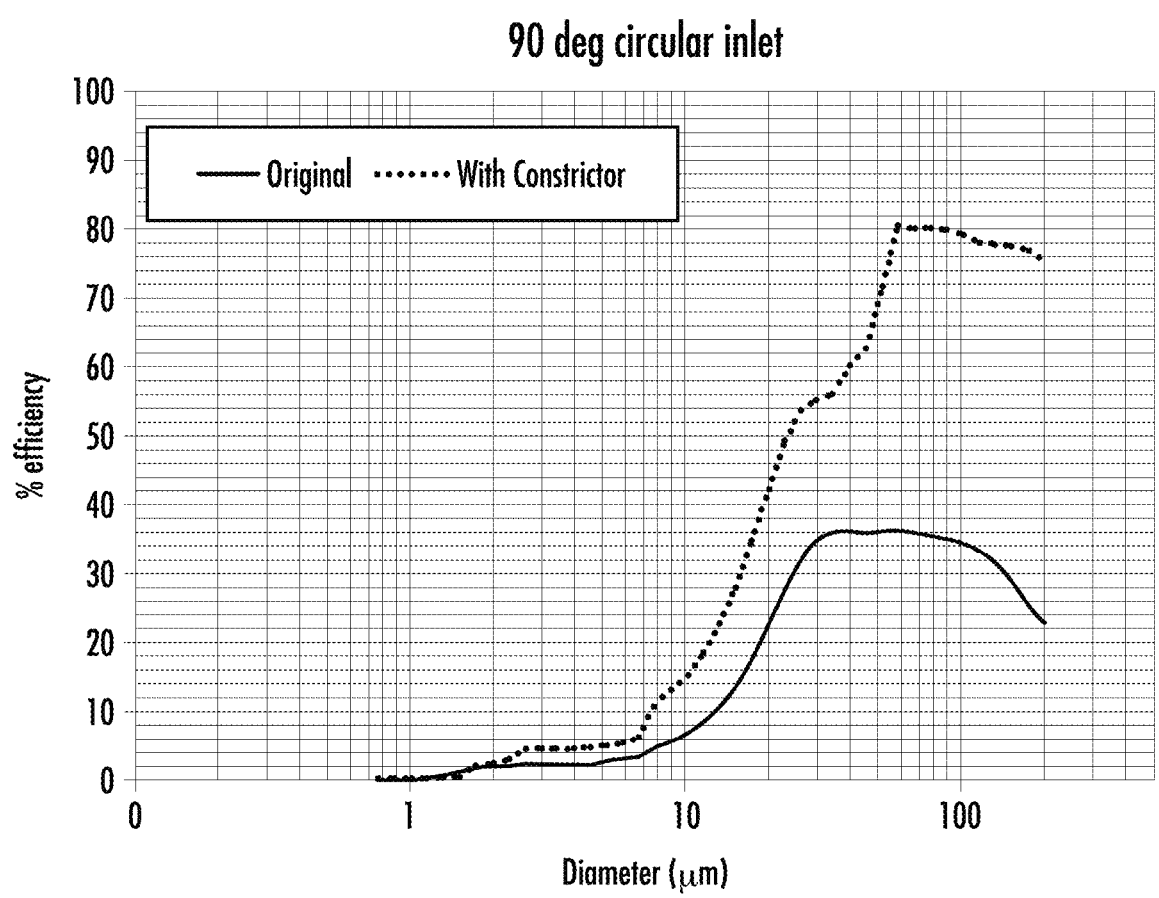
FIG. 18 is further test data.
Figure 19:
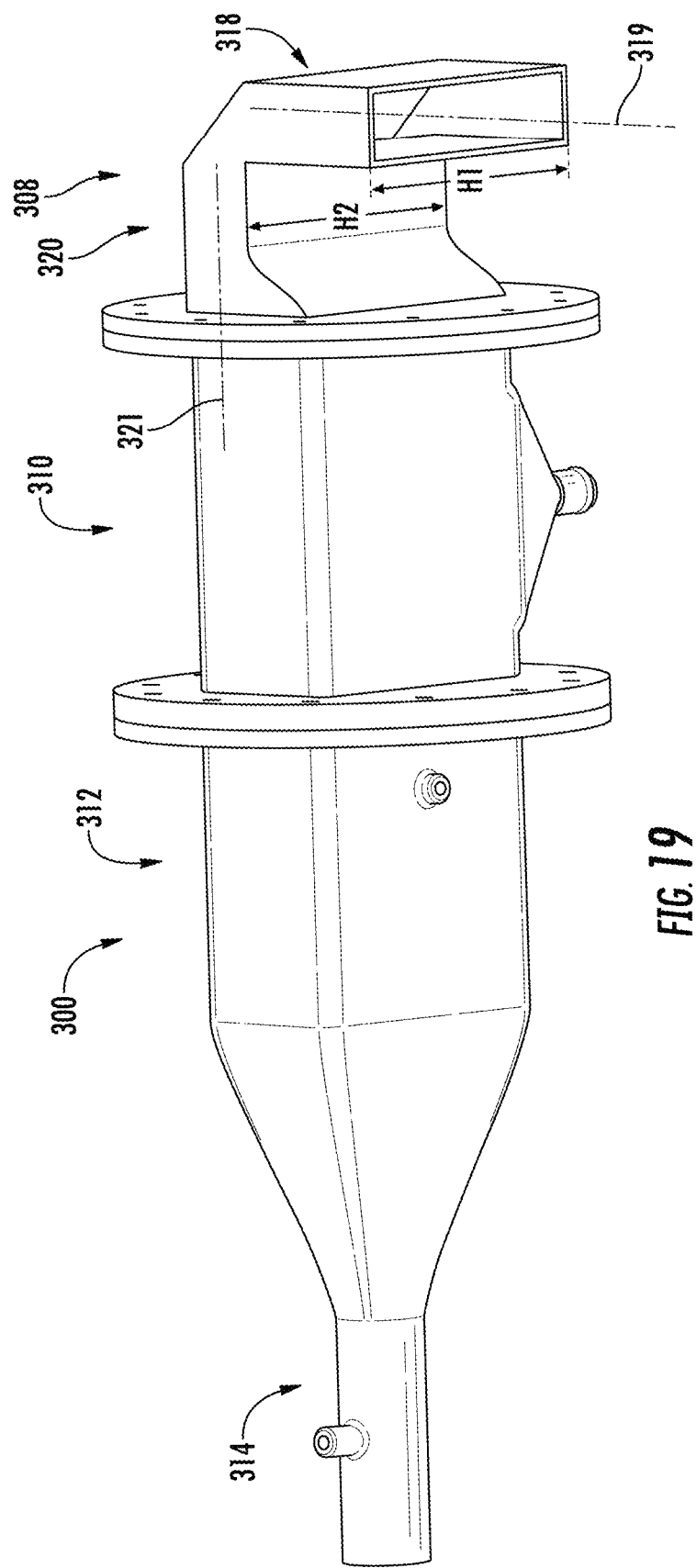
FIG. 19 is a perspective illustration of a further embodiment of an air cleaner assembly.
Figure 20:
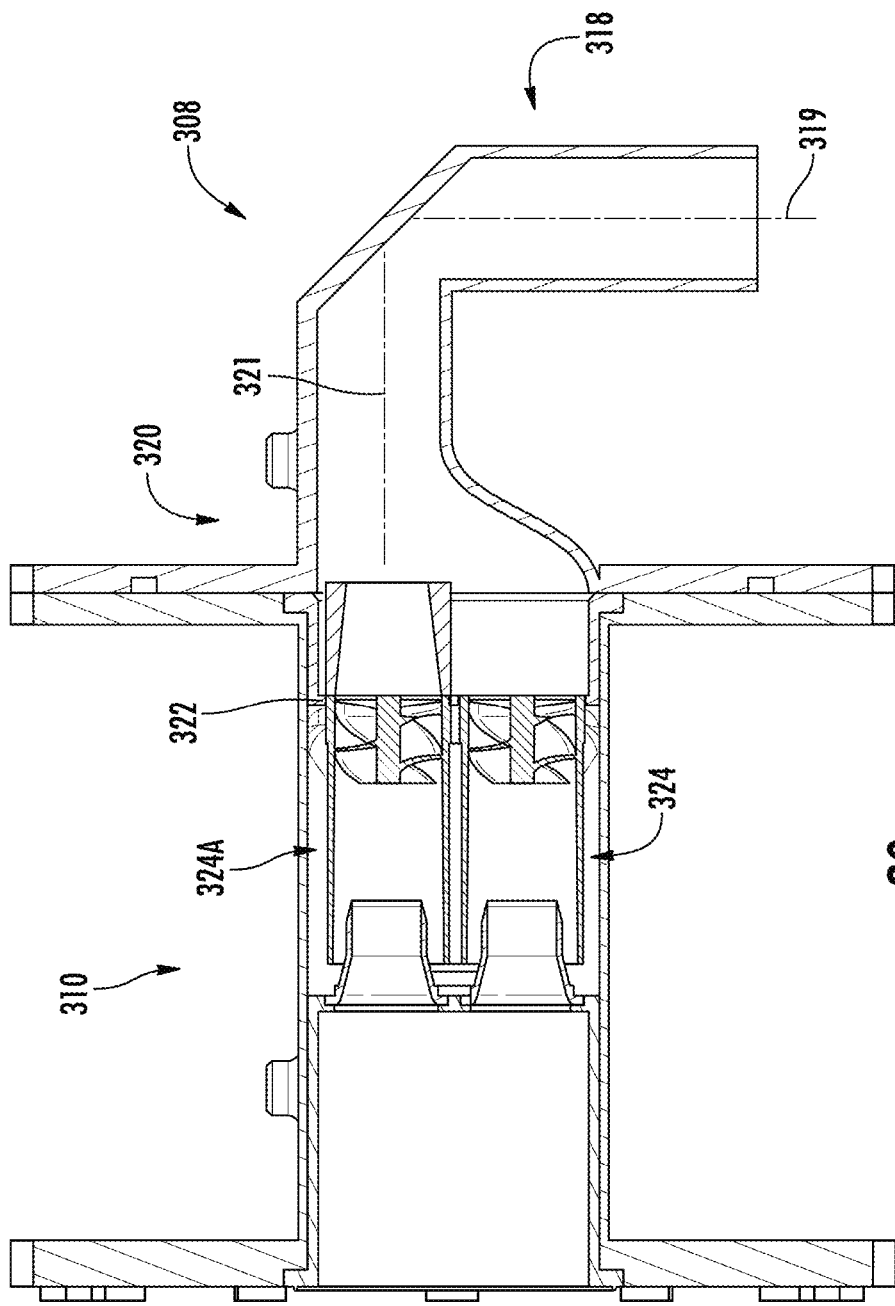
FIGS. 20-22 are cross-sectional illustrations of the air cleaner assembly of FIG. 19.
Figure 21:
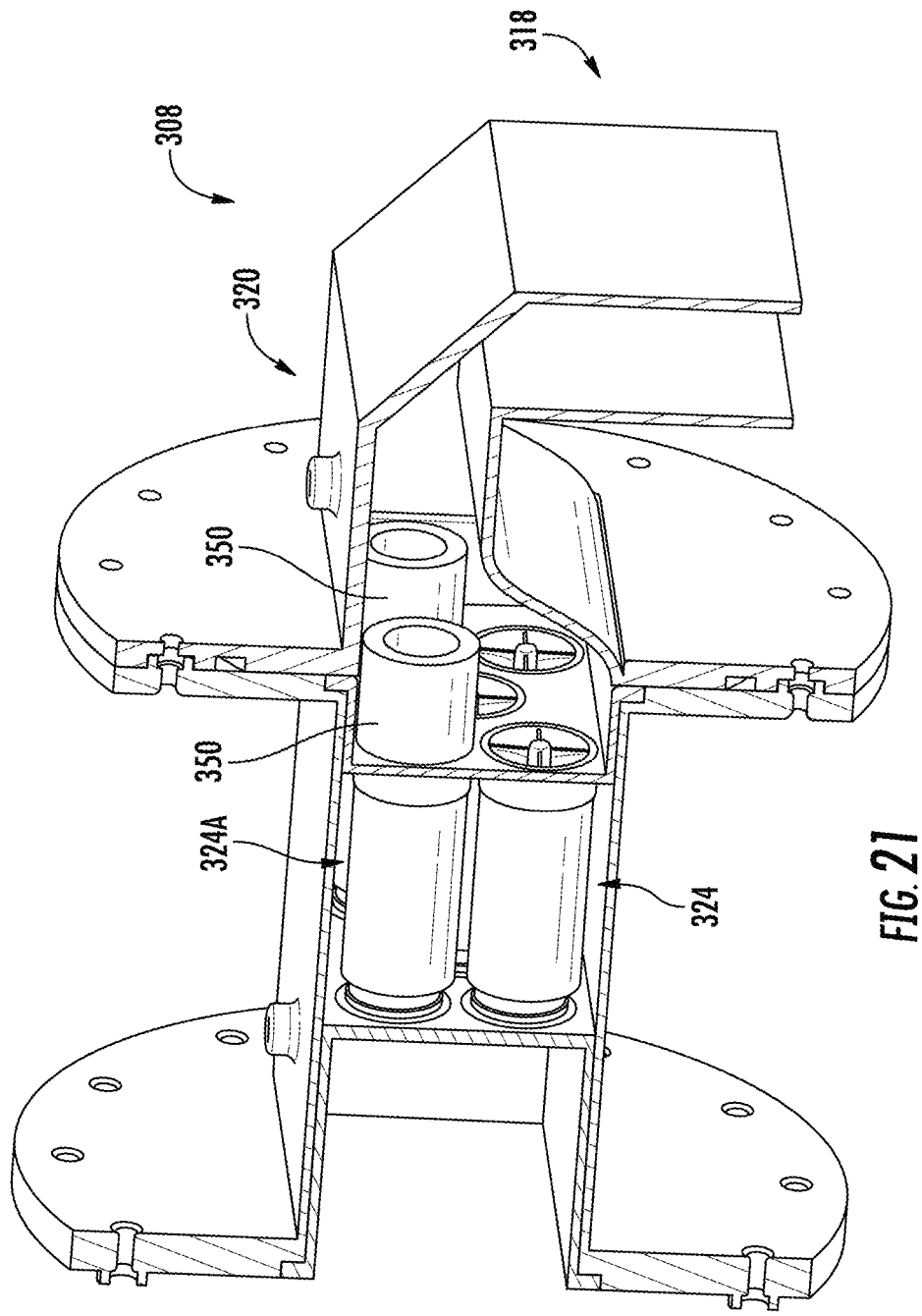
Figure 22:
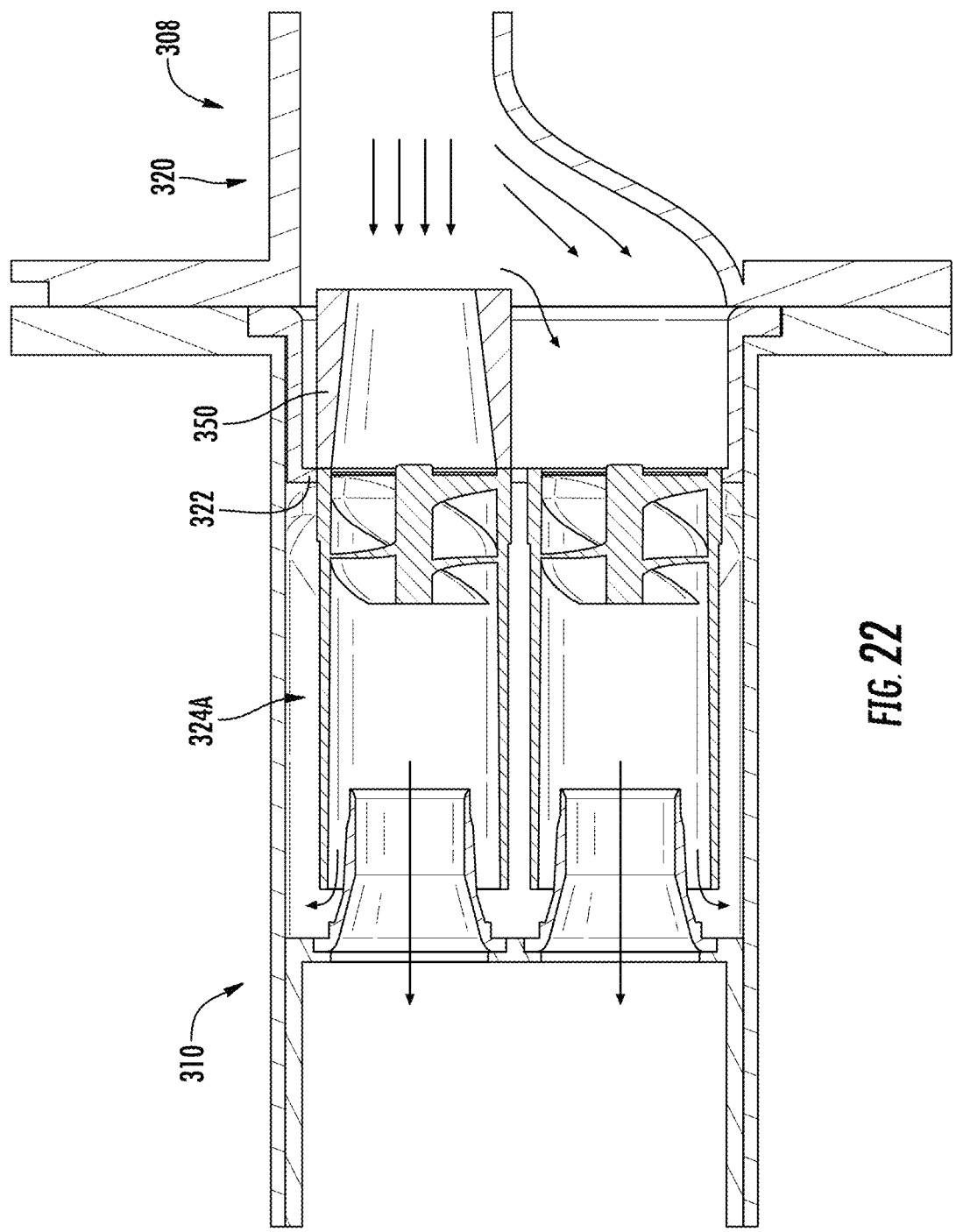

FIGS. 17 and 18 provide experimental date for the use of a constrictor and housing arrangement of the prior embodiment. The standard deviation in percentage of mass flow between the various spin tubes 224 is reduced to 1.5% from 5.7%, which is a 74% reduction in standard deviation in the percentage of mass flow. Additionally, the testing illustrates that improved particulate removal efficiency occurs as compared to the arrangement without the constrictors (see e.g. the dashed line as compared to the solid line in FIG. 18).

FIGS. 19-22 illustrate a further contemplated embodiment of an air cleaner system 300 in representative form. This system includes a housing that includes a housing inlet 308, a pre-cleaner housing 310, a filter housing 312 and a housing outlet 314. This embodiment is similar to the prior embodiment in that the housing inlet 308 includes a bend between the upstream region 318 and downstream region 320 thereof.

Unlike prior designs, the upstream region 318 has a rectangular cross-section and vertical height H1 that is equal to the vertical height H2 of the downstream region 320. Again, however, the cross-sectional area of the upstream region 318 is smaller than the cross-sectional area of the downstream region 320 or of the spin tube panel 322.

Like the prior implementation, the constrictors 350 are offset toward a side of the spin tube panel 322. The constrictors 350 are again offset toward the side such that they align with the spin tubes 324A that align with the high mass flow portion of the inlet airflow while the spin tubes 324 that do not include corresponding constrictors are aligned with low mass flow portions of the inlet air flow.

Figure 23:
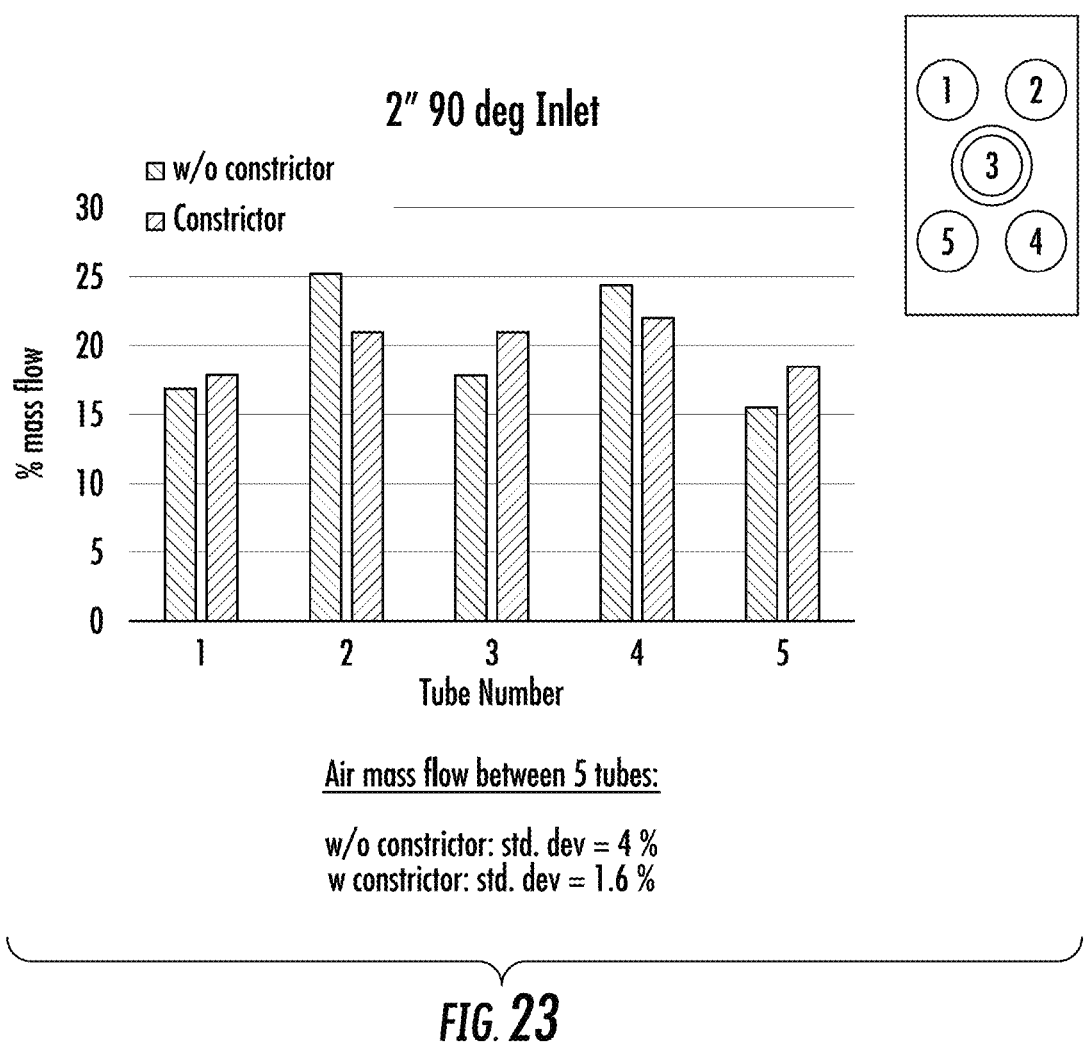
FIGS. 23 and 30 illustrate test data related to use of an air cleaner assembly of FIG. 19.

FIGS. 23 and 30 provide experimental data when using the configuration outlined above. FIG. 23 illustrates a mass flow distribution based on percentage of total mass flow. Here, the use of constrictors 350 increased uniformity of the mass flow through the individual spin tubes. Further, the plots in FIG. 30 further illustrate the improved efficiency by using the spin tube configuration of the prior embodiment.

FIGS. 24-28 illustrate further constrictors 450, 550, 650, 750, 850 that are contemplated. These constrictors 450, 550, 650, 750, 850 have different cross-sectional shapes than the prior designs.

Figure 24:
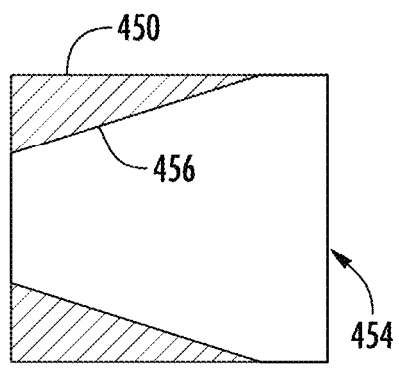
FIGS. 24-29 are simplified cross-sectional illustrations of alternative constrictor bodies useable in the prior air cleaner assemblies.

The constrictor of FIG. 24 is similar to previously discussed designs. However, this design has a taper that does not extend the entire length of the constrictor 450. This design may allow for manufacturing ease or for assembly ease but if a larger length is desired.

Figure 25:
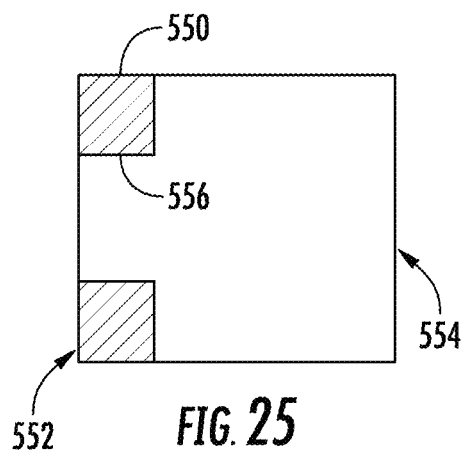

The constrictor of FIG. 25 may be less desirable as they may promote separation of the incoming air flow from the inner surface 556 of the constrictor body due to the sharp transition from the smaller diameter inlet 552 to the larger diameter outlet 554. However, this type of constrictor 550 may be easier for manufacturing purposes. Further, in some scenarios, one might require a large local restriction, but may also have limited axial space. This geometry would help in this case by forcing flow separation at the back of step 556. However, it may provide sufficient time/length to allow flow to spread radially back across the cross-sectional area prior to entering an associated spin tube.

It is noted that these embodiments illustrate that the transition from the inlet diameter to the outlet diameter need not extend the entire length of the constrictor body.

For example, the inner surface 456, 656 of constrictors 450, 650 are similar to that of inner surface 156 of constrictor 150 that the tapered region is a constant taper. However, in this embodiment, the tapered region extends less than the entire length and stops short of outlet 454, 654.

Figure 26:
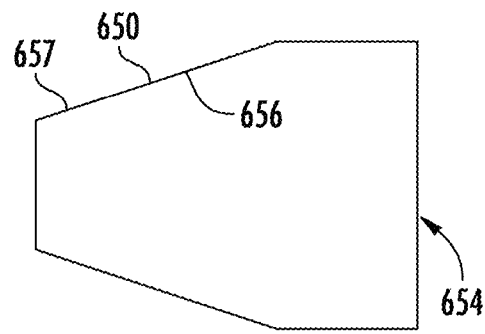

The constrictor of FIG. 26 also includes a tapered outer surface 657. It is contemplated that this tapered outer surface 657 may further improve spreading the air and thus the uniformity of air mass flow through the spin tubes that do not include constrictors as the tapered outer surface 657 may help direct air flow towards the other spin tubes.

Figure 27:
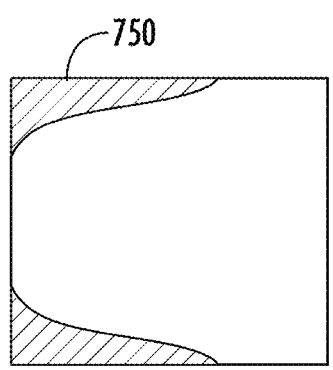
Figure 28:
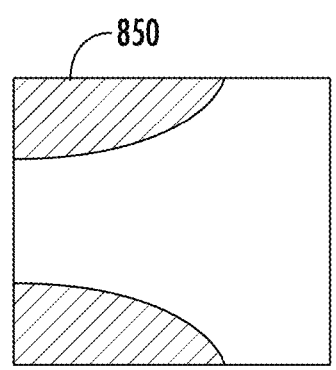

The constrictor of FIG. 27 may be more difficult to manufacture. However, it is contemplated that with this design, this design could, in some instances, help by forcing flow separation at a specific location (e.g. similar to the constrictor of FIG. 25). As long as the flow is fully spread across the outer diameter when it meets the spin tube inlet, increased performance should be achieved with desired results.

The constrictor of FIG. 28 can again help ease flow separation.

Again, all of the constrictors 450, 550, 650, 750, 850 have an inlet that is smaller in diameter than the outlet thereof. Further, the inlet thereof would typically be smaller than the corresponding inlet of any corresponding spin tube.

FIG. 29 illustrates a further embodiment of an air cleaner assembly 1000. This system is similar in some respects as the assembly 300 of FIG. 19. This is because the housing inlet 1008 of this embodiment is similarly configured as housing inlet 308.

This embodiment includes a plurality of constrictors 1050 aligned in a row and associated with four corresponding spin tubes that align with a higher mass flow portion of the airflow passing to the pre-cleaner from housing inlet 1008. In this embodiment, the assembly has 8 spin tubes 1024. Four spin tubes 124 have associated constrictors 1050, while four spin tubes 124 are free of any constrictors.

In some embodiments, the constrictors are removably attachable adjacent the spin tubes. This allows for customization and testing of different constrictor/spin tube configurations for determining improved constrictor placement as well as testing different shape/sized constrictors. One consideration is it allows a user to customize which constrictors to use/where to use them to remain below maximum allowable pressure drop values across the pre-cleaner.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A spin tube assembly for an engine air cleaner having a housing including a housing inlet, the spin tube assembly comprising:
   a spin tube panel located downstream of the inlet;
   a plurality of spin tubes supported on the spin tube panel, the plurality of spin tubes configured for receiving air from the housing inlet, each spin tube of the plurality of spin tubes including a helical element causing air entering the spin tube to rotate such that particles within the air are moved by centrifugal action outwardly against a wall of the spin tube;
   a constrictor upstream from the helical element of at least one spin tube of the plurality of spin tubes, the constrictor causing a localized restriction of air entering the at least one spin tube compared to the spin tubes without constrictors, the constrictor having a constrictor inlet and a constrictor outlet, an inner dimension of the constrictor increases when moving from the constrictor inlet to the constrictor outlet; and
   wherein the plurality of spin tubes includes a constrictor free spin tube that is a spin tube of the plurality of spin tubes that does not include a constrictor upstream thereof and in line with a constrictor such that the air flowing through the constrictor free spin tube does not pass through a constrictor prior to passing through the constrictor free spin tube.

2. The spin tube assembly as in claim 1, wherein the plurality of spin tubes are arranged in a matrix including a central spin tube, and the constrictor is located upstream from the central spin tube.

3. The spin tube assembly as in claim 1, wherein the constrictor includes a constrictor tube, an inner diameter of the constrictor tube increasing in dimension when moving from a constrictor inlet of the constrictor tube that receives air from the housing inlet to a constrictor outlet of the constrictor tube directing air to the at least one spin tube.

4. A spin tube assembly for an engine air cleaner having a housing including a housing inlet, the spin tube assembly comprising:
   a spin tube panel located downstream of the inlet;
   a plurality of spin tubes supported on the spin tube panel, the plurality of spin tubes configured for receiving air from the housing inlet, each spin tube of the plurality of spin tubes including a helical element causing air entering the spin tube to rotate such that particles within the air are moved by centrifugal action outwardly against a wall of the spin tube;

a constrictor upstream from the helical element of at least one spin tube of the plurality of spin tubes, the constrictor causing a localized restriction of air entering the at least one spin tube compared to the spin tubes without constrictors;

wherein the constrictor includes a constrictor tube, an inner diameter of the constrictor tube increasing in dimension when moving from a constrictor inlet of the constrictor tube that receives air from the housing inlet to a constrictor outlet of the constrictor tube directing air to the at least one spin tube;

wherein the plurality of spin tubes are arranged in a matrix including a first spin tube, and the constrictor is located upstream from the first spin tube;

wherein the inner diameter of the constrictor tube at the constrictor outlet is the same as an inner diameter of an inlet of the at least one spin tube.

5. The spin tube assembly of claim 1, wherein air flow exiting the housing inlet has an uneven mass flow including a high mass flow region and a low mass flow region, the constrictor being located inline with the high mass flow region.

6. The spin tube assembly of claim 5, further including the housing inlet, the housing inlet includes duct work that has an upstream region, a bend and a downstream region, the bend being positioned between the upstream region and the downstream region, the downstream region being oriented such that air flow exiting the downstream region is directed substantially directly at the spin tube panel.

7. The spin tube assembly of claim 1, wherein the constrictor includes a constrictor body having a constrictor inlet and a constrictor outlet, the constrictor inlet having a constrictor inlet diameter, the constrictor inlet being upstream of the constrictor outlet, the at least one spin tube of the plurality of spin tubes that includes a constrictor upstream thereof has a spin tube inlet that has a spin tube inlet diameter that is greater than the constrictor inlet diameter.

8. The spin tube assembly of claim 7, wherein the constrictor outlet has a constrictor outlet diameter, the constrictor outlet diameter is greater than the constrictor inlet diameter.

9. The spin tube assembly of claim 3, wherein the constrictor tube has an outer periphery, the outer periphery has a tapered outer periphery portion, a diameter of the outer periphery portion increasing when moving from the constrictor inlet toward the constrictor outlet.

10. The spin tube assembly of claim 9, wherein the inner diameter of the constrictor tube tapers from the constrictor inlet to the constrictor outlet.

11. The spin tube assembly of claim 1, wherein:
the constrictor comprises a constrictor tube having a constrictor inlet that receives air from the housing inlet and a constrictor outlet directing air to the at least one spin tube;
the constrictor has a length between the constrictor inlet and the constrictor outlet;
the constrictor tube has an inner periphery, the inner periphery having a tapered portion, the tapered portion increasing in diameter when moving toward the constrictor outlet.

12. The spin tube assembly of claim 11, wherein the tapered portion extends less than the entire length between the constrictor inlet and the constrictor outlet.

13. The spin tube assembly of claim 12, wherein the increase in cross-sectional area of the tapered portion is non-linear when moving toward the constrictor outlet.

14. The spin tube assembly of claim 11, wherein an angle of the inner periphery of the constrictor tube is configured such that an entirety of a diameter of a corresponding downstream helical element is used to spin the flowing air through the corresponding spin tube at a predetermined air flow rate.

15. The spin tube assembly of claim 1, wherein:
the plurality of spin tubes defines a spin tube inlet plane that is generally orthogonal to air flow through the plurality of spin tubes and is axially located at inlets of the plurality of spin tubes;
a constrictor inlet of the constrictor being positioned axially upstream of the inlet plane.

16. A spin tube assembly for an engine air cleaner having a housing, the spin tube assembly comprising:
a spin tube panel located downstream of the inlet;
a plurality of spin tubes supported on the spin tube panel, the plurality of spin tubes configured for receiving air from the housing inlet, each spin tube of the plurality of spin tubes including a helical element causing air entering the spin tube to rotate such that particles within the air are moved by centrifugal action outwardly against a wall of the spin tube;
a constrictor upstream from the helical element of at least one spin tube of the plurality of spin tubes, the constrictor causing a localized restriction of air entering the at least one spin tube compared to the spin tubes without constrictors;
a housing inlet having an upstream region that has a first cross-sectional area that is generally orthogonal to the flow air therethrough and a downstream region having a second cross-sectional area that is generally orthogonal to the flow of air therethrough, the second cross-sectional area being greater than the first cross-sectional area, air flowing through the downstream region has a non-uniform mass flow; and wherein a constrictor inlet of the constrictor being located in line with and downstream from a portion of the downstream region having a first localized mass flow that is greater than the average mass flow through the downstream region;
wherein the plurality of spin tubes includes a constrictor free spin tube that is a spin tube of the plurality of spin tubes that does not include a constrictor upstream thereof and in line with a constrictor such that the air flowing through the constrictor free spin tube does not pass through a constrictor prior to passing through the constrictor free spin tube, an inlet of the constrictor free spin tube being located in line with and downstream from a portion of the downstream region having a second localized mass flow that is less than the first localized mass flow.

17. The spin tube assembly of claim 1, further including the housing inlet, the housing inlet has an upstream region that has a first cross-sectional area that is generally orthogonal to the flow air therethrough and a downstream region having a second cross-sectional area that is generally orthogonal to the flow of air therethrough, the second cross-sectional area being greater than the first cross-sectional area, air flowing through the downstream region has a non-uniform mass flow; and wherein a constrictor inlet of the constrictor being located in line with and downstream from a portion of the downstream region having a first localized mass flow that is greater than the average mass flow through the downstream region wherein an inlet of the constrictor free spin tube is located in line with and downstream from a portion of the downstream region having a second localized mass flow that is less than the first localized mass flow.

18. The spin tube assembly of claim 1, wherein the constrictor is not a deflector.

19. A method of removing particulates from a stream of air comprising:

flowing the air through the constrictor of the spin tube assembly of claim 11 at a predetermined rate, the tapered portion of the inner periphery of the constrictor tube being configured wherein an angle of the inner periphery of the constrictor tube is configured such that an entirety of a diameter of a corresponding downstream helical element is used to spin the flowing air through the corresponding spin tube at a predetermined air flow rate.

20. A method of configuring a spin tube assembly of claim 1, comprising:

determining a mass flow distribution of air flowing through the spin tubes without the constrictor at a predetermined rate; and locating a constrictor upstream of at least one spin tube of the plurality of spin tubes that has a greater amount of mass flow than at least one other spin tube of the plurality of spin tubes.

21. A spin tube assembly for an engine air cleaner, the spin tube assembly comprising:

an inlet configured such that an air flow through the inlet has a non-uniform mass flow;

a plurality of spin tubes downstream of the inlet configured to receive air from the inlet, each spin tube of the plurality of spin tubes including a helical element causing air entering the spin tube to rotate such that particles within the air are moved by centrifugal action outwardly against a wall of the spin tube;

a constrictor upstream from the helical element of at least one spin tube of the plurality of spin tubes, the constrictor causing a localized restriction of air entering the at least one spin tube compared to the spin tubes without constrictors, a constrictor inlet of the constrictor being located in line with a portion of air flow through the inlet having a first localized mass flow that is greater than an average mass flow through inlet; and wherein the plurality of spin tubes includes a constrictor free spin tube that is a spin tube of the plurality of spin tubes that does not include a constrictor upstream thereof and in line with a constrictor such that the air flowing through the constrictor free spin tube does not pass through a constrictor prior to passing through the constrictor free spin tube, an inlet of the constrictor free spin tube being located in line with and downstream from a portion of the air flow through the inlet having a second localized mass flow that is less than the first localized mass flow.

* * * * *

UNITED STATES PATENT AND TRADEMARK OFFICE
CERTIFICATE OF CORRECTION

PATENT NO. : 12,006,899 B2  
APPLICATION NO. : 17/734725  
DATED : June 11, 2024  
INVENTOR(S) : Sucharitha Rajendran et al.

Page 1 of 1

It is certified that error appears in the above-identified patent and that said Letters Patent is hereby corrected as shown below:

In the Claims

Column 14, Claim 16, Line 42 currently reads:
"has a non-uniform mass flow; and wherein a constrictor"
Should correctly read:
--has a non-uniform mass flow; and
wherein a constrictor--

Column 15, Claim 17, Line 5 currently reads:
"downstream region"
Should correctly read:
--downstream region;--

Signed and Sealed this
Twenty-seventh Day of August, 2024

Katherine Kelly Vidal
*Director of the United States Patent and Trademark Office*